(12) United States Patent
Winter et al.

(10) Patent No.: US 8,553,871 B2
(45) Date of Patent: Oct. 8, 2013

(54) CALL MONITORING SYSTEM

(75) Inventors: Richard A. Winter, Honolulu, HI (US); Boris Medak, Sonoma, CA (US)

(73) Assignee: Knowme, Inc., Novato, CA (US)

( * ) Notice: Subject to any disclaimer, the term of this patent is extended or adjusted under 35 U.S.C. 154(b) by 1314 days.

(21) Appl. No.: 11/883,205

(22) PCT Filed: Jan. 27, 2006

(86) PCT No.: PCT/US2006/003554
§ 371 (c)(1),
(2), (4) Date: May 5, 2008

(87) PCT Pub. No.: WO2007/084146
PCT Pub. Date: Jul. 26, 2007

(65) Prior Publication Data
US 2008/0292070 A1 Nov. 27, 2008

Related U.S. Application Data

(60) Provisional application No. 60/648,208, filed on Jan. 28, 2005.

(51) Int. Cl.
*H04M 3/00* (2006.01)
(52) U.S. Cl.
USPC .................... 379/265.06; 379/265.12
(58) Field of Classification Search
USPC ........... 379/88.13–88.14, 265.01–265.06, 34, 379/67.1; 704/251
See application file for complete search history.

(56) References Cited

U.S. PATENT DOCUMENTS

| 5,818,907 | A | * | 10/1998 | Maloney et al. | ........... 379/32.01 |
| 6,058,163 | A | * | 5/2000 | Pattison et al. | .......... 379/265.06 |
| 6,766,012 | B1 | * | 7/2004 | Crossley | .................. 379/265.02 |
| 2001/0014143 | A1 | * | 8/2001 | Kuhn | ........................... 379/67.1 |
| 2002/0085705 | A1 | * | 7/2002 | Shires | ....................... 379/265.04 |
| 2004/0064316 | A1 | * | 4/2004 | Gallino | ......................... 704/251 |
| 2004/0136503 | A1 | | 7/2004 | Kass | |

OTHER PUBLICATIONS

USPTO; International Search Report and Written Opinion mailed Jul. 30, 2008 for application No. PCT/US06/03554.

* cited by examiner

*Primary Examiner* — Mohammad Islam
*Assistant Examiner* — Van D Huynh
(74) *Attorney, Agent, or Firm* — Kilpatrick Townsend & Stockton LLP

(57) ABSTRACT

According to one embodiment of the invention, a method of monitoring consumer calls placed to a business and conducted between a consumer and a business representative can comprise receiving a telephone call placed to a business from a consumer; directing the telephone call to a business representative for the business; recording a telephone conversation between the business representative and the consumer; storing the recorded conversation in a memory device; recording a plurality of conversations between a plurality of consumers and at least the business representative; providing the business representative with access to the plurality of recorded conversations in which the business representative participated so as to be able to play back at least one of the recorded conversations.

23 Claims, 22 Drawing Sheets

| | A | B | C | D | E | F | G | H | I |
|---|---|---|---|---|---|---|---|---|---|
| 1 | CallDemand | | | | | | | | |
| 2 | www.CallDemand.com | | | | | | | | |
| 3 | | | | | | | | | |
| 4 | Reading Car Group | | | | | | | | |
| 5 | 355 South Reading Ave. | | | | | | | | |
| 6 | Reading CA, 92373 | | | | | | | | |
| 7 | Tel: (949) 779-8537 | | | | | | | | |
| 8 | | | | | | | | | |
| 9 | | | | | | | | | |
| 10 | Call List report using dates: 8/20/2004 - 8/27/2004 | | | | | | | | |
| 11 | Date | Call Type | Call Length | Ring Length | Caller | Dialed # | Toll Free # | Ring To # | Name | Campaign Name |
| 12 | 8/25/2004 | Incoming | 00:03:29 | 00:03:15 | 949-777-2300 | 844-679-MILE | 949-667-1223 | Mr. G Major | Milestone Car |
| 13 | 8/25/2004 | Incoming | 00:02:00 | 00:01:45 | 310-277-1003 | 822-777-CARS | 888-996-AUTO | 949-667-1223 | Chris Jenkins | Car Web Site |
| 14 | 8/25/2004 | Incoming | 00:01:00 | 00:00:43 | 949-333-1722 | 888-996-AUTO | 949-667-1223 | Frank Solis | Auto Exact |
| 15 | 8/25/2004 | Incoming | 00:03:05 | 00:02:27 | 949-333-1722 | 888-996-AUTO | 949-667-1223 | Mike Andrew | Auto Exact |
| 16 | 8/25/2004 | Incoming | 00:02:34 | 00:02:19 | 949-333-1722 | 888-996-AUTO | 949-667-1223 | | Auto Exact |
| 17 | 8/25/2004 | Incoming | 00:05:55 | 00:05:37 | 955-755-6123 | 877-555-VELO | 877555VELO | 949-667-1223 | CREATE PROSPECT | Velocity Auto |
| 18 | 8/25/2004 | Incoming | 00:02:29 | 00:02:11 | 949-777-2300 | 844-679-MILE | 949-667-1223 | Mr. G. Major | Milestone Car |

FIG. 17

CALL MONITORING SYSTEM

One embodiment of the invention relates generally to business representative services. For example, one embodiment of the invention relates to call monitoring of telephone calls placed to a business representative.

BACKGROUND

In many industries, customer representatives service a variety of requests from consumers. One example is the automotive sales industry where sales personnel field telephone calls from prospective customers. Another example is any business that utilizes a receptionist to interface with customers or clients, such as a law firm or doctor's office.

In the automotive sales industry, for example, it can be very difficult for a supervisor to monitor the quality of service provided by different sales representatives. Given the vast number of phone calls that are received in reply to different advertising campaigns, the supervisor is typically not able to monitor the quality of service provided in those phone calls.

Historically, the automotive industry has used advertising campaigns to solicit calls from prospective consumers. For example, advertisements are often placed in newspapers or in other advertising media to solicit phone calls from consumers. Conversion of these consumer calls typically results in only a three percent phone-up, i.e., conversion of the phone call to an actual sale of a vehicle. Thus, the percentage is extremely low relative to the amount of advertising that is spent to solicit the phone calls.

One of the reasons that the conversion of inquiries to actual sales is so low is due to the fact that the automotive industry has a significant amount of turnover of its sales personnel. Thus, oftentimes, a new sales representative handles calls and is ineffective in converting the calls to appointments. As a result, sales are lost. According to some industry analysts, a well-trained sales person should typically be able to obtain the name and number of a consumer during a phone inquiry 90-95% of the time. Furthermore, an appointment should typically be arranged with these consumers approximately 65% of the time. Assuming that 60% of these appointments show up at the dealership, and 60% of those visits result in a closing on an automobile, the resulting sales should be roughly 18-24% of the initial phone inquiries. This is a substantial improvement over the traditional phone-ups of 3% at which the automotive sales industry currently operates. Thus, the actual number of 3% points to a deficiency in training of current sales personnel.

Other businesses suffer from similar problems. New receptionists for example are oftentimes not familiar with the procedures of an office and can give a poor impression of the business to a prospective customer or client. Thus, there is a need for a system that would provide greater improvement in how telephone calls are handled by business representatives.

SUMMARY

According to one embodiment of the invention, a method of monitoring consumer calls placed to a business and conducted between a consumer and a business representative comprises receiving a telephone call placed to a business from a consumer; directing the telephone call to a business representative for the business; recording a telephone conversation between the business representative and the consumer; storing the recorded conversation in a memory device; recording a plurality of conversations between a plurality of consumers and at least the business representative; providing the business representative with access to the plurality of recorded conversations in which the business representative participated so as to be able to play back at least one of the recorded conversations.

According to another embodiment of the invention, a quality control check can be implemented by receiving a telephone call placed to a business from a consumer; directing the telephone call to a business representative for the business; recording a telephone conversation between the business representative and the consumer; storing the recorded conversation in a memory device; recording a plurality of conversations between a plurality of consumers and at least the business representative; providing a user interface for accessing the plurality of recorded conversations; providing a quality control supervisor with access to the plurality of recorded conversations; allowing the quality control supervisor to select one of the plurality of recorded conversations from the user interface so as to play back the selected recorded conversation.

Yet another embodiment of the invention relates to insuring that a business representative is accountable for handling a telephone call by receiving a telephone call placed to a business from a consumer; directing the telephone call to a business representative for the business; requiring the business representative to enter a business representative identifier so as to identify the business representative as having answered the telephone call; connecting the telephone call between the consumer and the business representative after the business representative enters the business representative identifier.

A further embodiment of the invention relates to a method of compensating a business representative by recording a plurality of conversations between a plurality of consumers and at least the business representative; determining the recorded conversations that the business representative handled during a predetermined period of time; compensating the business representative based on the recorded conversations.

BRIEF DESCRIPTION OF THE DRAWINGS

FIG. 12 illustrates a graphical user interface for storing and/or retrieving personal data about a consumer associated with a recorded conversation, according to one embodiment of the invention.

FIG. 16 illustrates a report generated in spreadsheet form for distribution, according to one embodiment of the invention.

FIG. 17 illustrates an example of a report listing business representative notes during a time period, according to one embodiment of the invention.

DESCRIPTION

Figure 1:
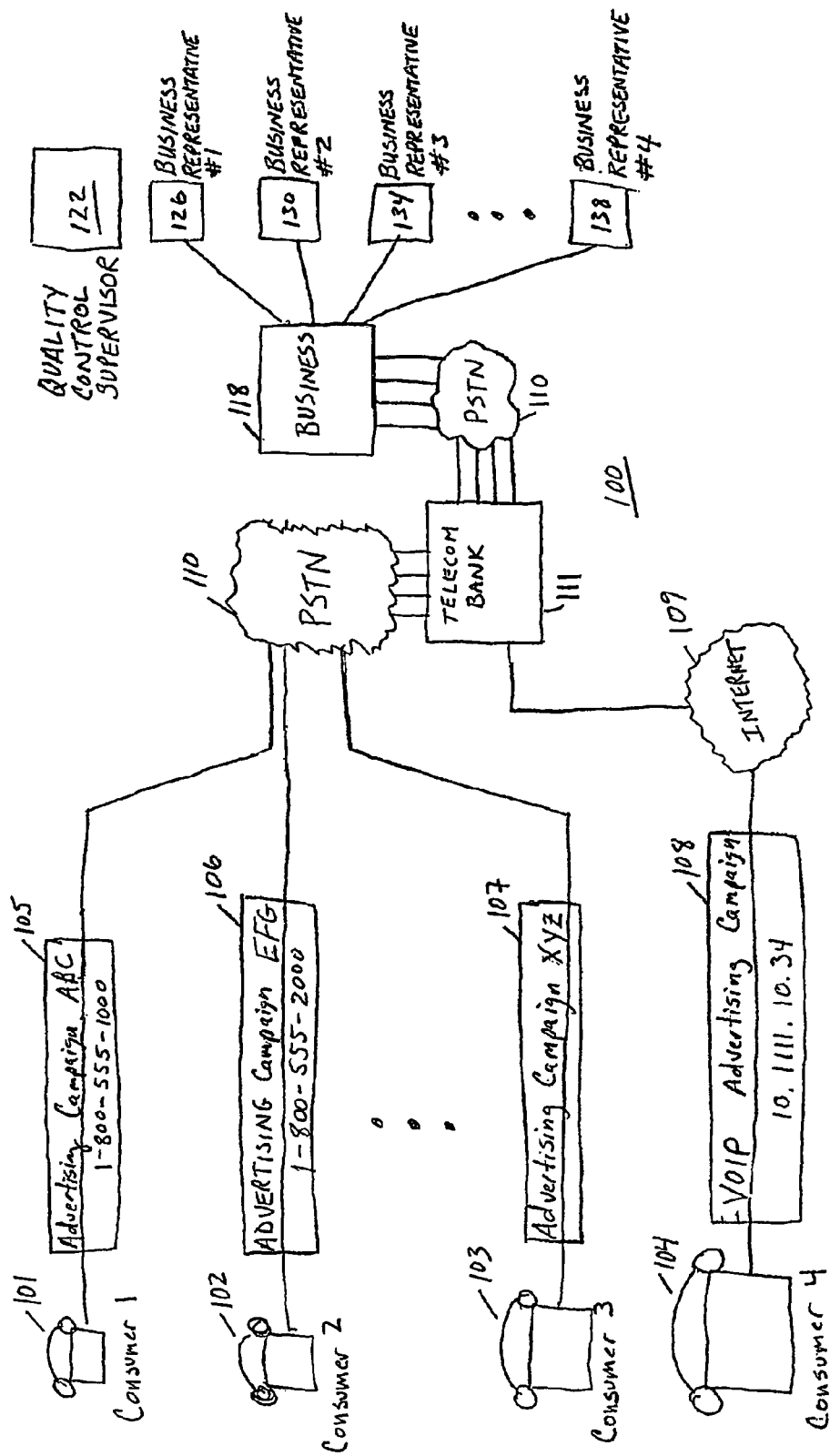
FIG. 1 illustrates a block diagram of a system for implementing a call monitoring service according to one embodiment of the invention.

Referring now to FIG. 1, one embodiment of the invention can be seen. FIG. 1 illustrates a block diagram demonstrating different advertising campaigns for a business. FIG. 1 shows, in system 100, multiple consumers at telephones 101, 102, 103 and 104 by which they can telephone or communicate with the business. FIG. 1 shows that consumer 1 at telephone 101 responds to a first advertising campaign designated as the ABC advertising campaign by calling the number associated with that advertising campaign 1-800-555-1000, as shown in block 105. Similarly, advertising campaign 106 is associated with consumer 2 at telephone 102 while advertising campaign 107 is associated with consumer 3 at telephone 103. Furthermore, consumer 4 at telephone 104 can communicate via a computer or cable network with a voice over IP (VOIP) system, as shown in block 108.

The calls from telephones 101, 102, and 103 can be placed over a telephone network, such as the public switched telephone network (PSTN) 110 to a phone bank 111. The phone bank serves as the receiving point for the calls placed to the advertising campaign telephone numbers. Furthermore, voice over IP communications can be received through network 109, such as the internet, at the phone bank. These telephone calls and VOIP communications can then be redirected to the business associated with the advertising campaigns. For example, consumer 1's call to 1-800-555-1000 could be redirected to a sales person at an automobile dealership in a different state. The calls can be routed through a network, such as PSTN 110 to a business 118 or directly to business representatives 126, 130, 134, and 138 for example.

Thus, FIG. 1 shows business 118 receiving calls placed by consumers 1, 2, 3, and 4. Incoming calls at the business 118 can be transferred to a business representative pool. According to one example, the method of transferring the calls can be selected by the business. For example, incoming calls may be assigned in a rotating manner so as to assign each successive call to a different business representative. Alternatively, incoming calls can be assigned to specified business representatives based on the telephone number or advertising campaign that was called. Thus, for example, business representative 1 designated in block 126 may receive at his or her telephone calls directed at advertising campaign ABC. Similarly, business representative 2 designed in block 130 may be assigned calls directed at advertising campaign EFG, as shown in block 106. Alternatively, incoming calls may be directed at the next available business representative in a pool of business representatives.

As noted above, the calls can be directed at specific business representatives without being routed through an intermediate call handler at business 118. This is particularly suitable when a business representative is assigned to a particular advertising campaign. Thus, all of the incoming calls to a business from phone bank 111 can be directed to that particular business representative's phone.

Furthermore, a quality control supervisor 122 can be provided to monitor the telephone calls received by the different business representatives. The quality control supervisor can be an employee of the business or a third party contractor assigned to perform quality control on the telephone calls.

When incoming calls are received at a business, they can be recorded according to a working embodiment of the invention. For example, each recorded call can be associated with an identifier for the business representative who fields the telephone call. Furthermore, the date and time that the call was received by the business representative, the length of the call, the calling number (which can be identified by a caller ID system), the name of the prospective consumer (which can be determined by a reverse telephone number look-up utilizing the calling number or simply provided by the consumer during the telephone conversation), the advertising campaign (which can be identified by the telephone number that was called and that was associated with a specific advertising campaign) can all be grouped as a set of data with the identifier for a particular business representative. Furthermore, this set of data can also include a status code to indicate the current status of the call, as well as a text section for recording notes about the call or subsequent follow-up calls. This set of data can then be stored in a database. Furthermore, for each received call, this set of information can be stored in a corresponding database entry.

Figure 2:
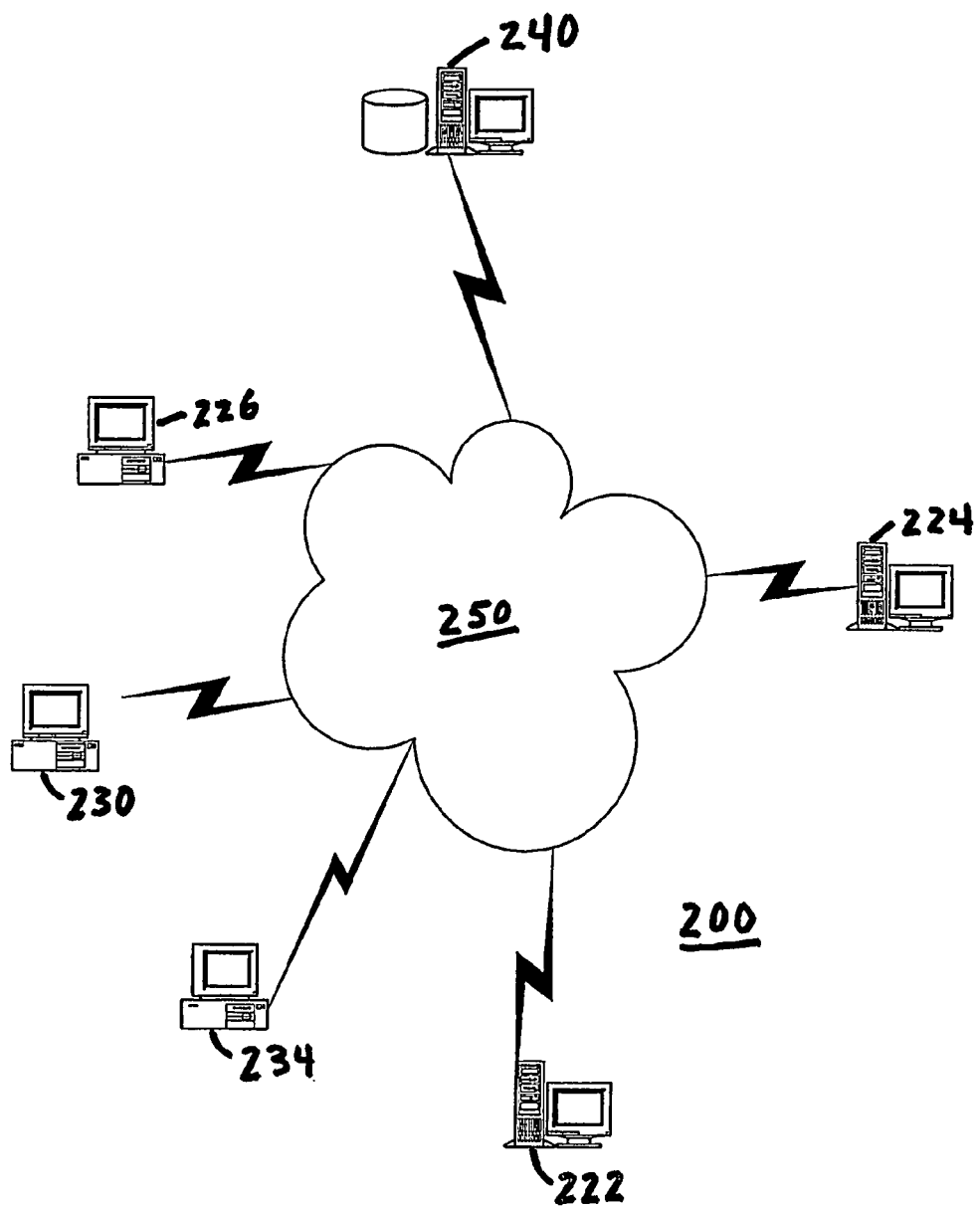
FIG. 2 illustrates a block diagram of a system for implementing a computerized call monitoring system according to one embodiment of the invention.

Referring now to FIG. 2, a computer system for implementing a call monitoring system can be seen, according to one embodiment of the invention. FIG. 2 illustrates a system 200 for providing business representatives with the capability to review recorded telephone conversations that they participated in. Furthermore, it provides access to recorded telephone conversations of the business representatives by supervisory or quality control personnel. FIG. 2 shows that business representatives 226, 230, and 234 can access via a network 250, such as the internet, a database computer 240 which stores recorded telephone conversations conducted by the business representatives. The computer database 240 can include application service provider software for implementing the call monitoring system. In such an instance, the business representatives could log into the application service provider software stored at computer 240 in network 250. This would allow computer 240 to serve as the central server for the call monitoring system. FIG. 2 also shows that a quality control supervisor 222 can be coupled via network 250 with the database at computer 240 that stores the recorded telephone conversations. In this fashion, the quality control supervisor can be provided with access to the recorded telephone conversations of the different business representatives 226, 230, and 234.

Furthermore, in system 200, computer 224 shows that a third party quality control provider can also be coupled with the database that stores the recorded telephone conversations. Thus, rather than having the supervisor at a business perform the quality control review of recorded telephone conversations, the third party could be utilized to grade the recorded telephone conversations. The third party quality control provider and/or the supervisor can then grade the recorded telephone conversations so as to provide feedback and reinforce the goals of the business in providing quality customer service.

Figure 3:
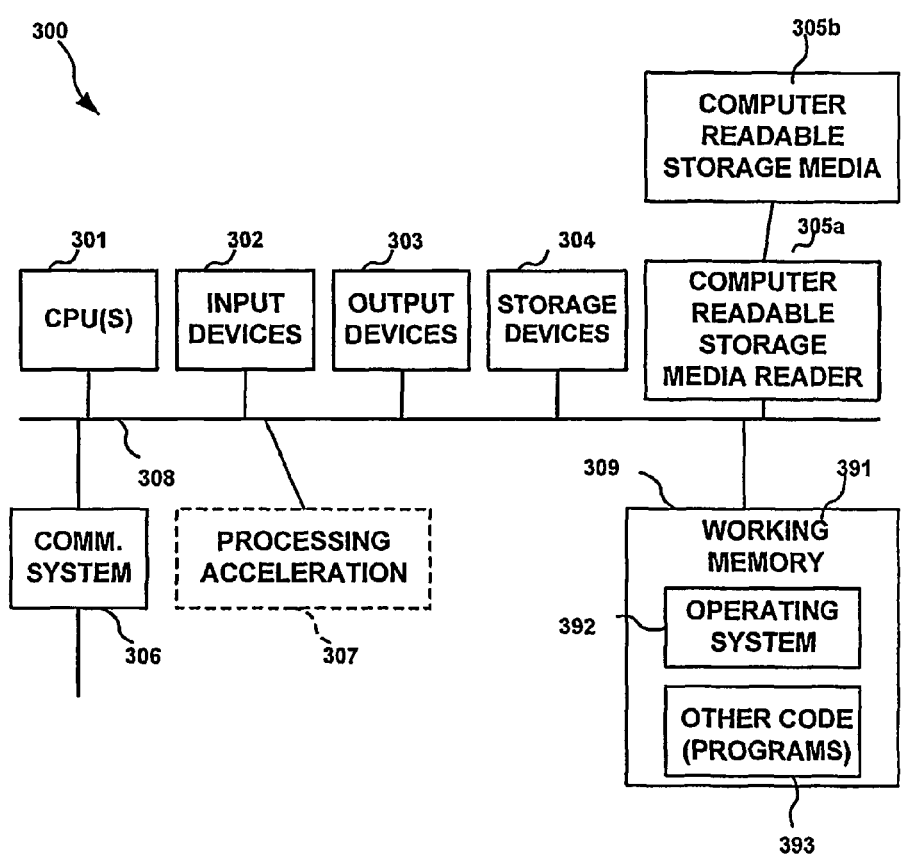
FIG. 3 illustrates a block diagram of a computing device suitable for implementing the computerized devices of FIG. 2.
Figure 4A:
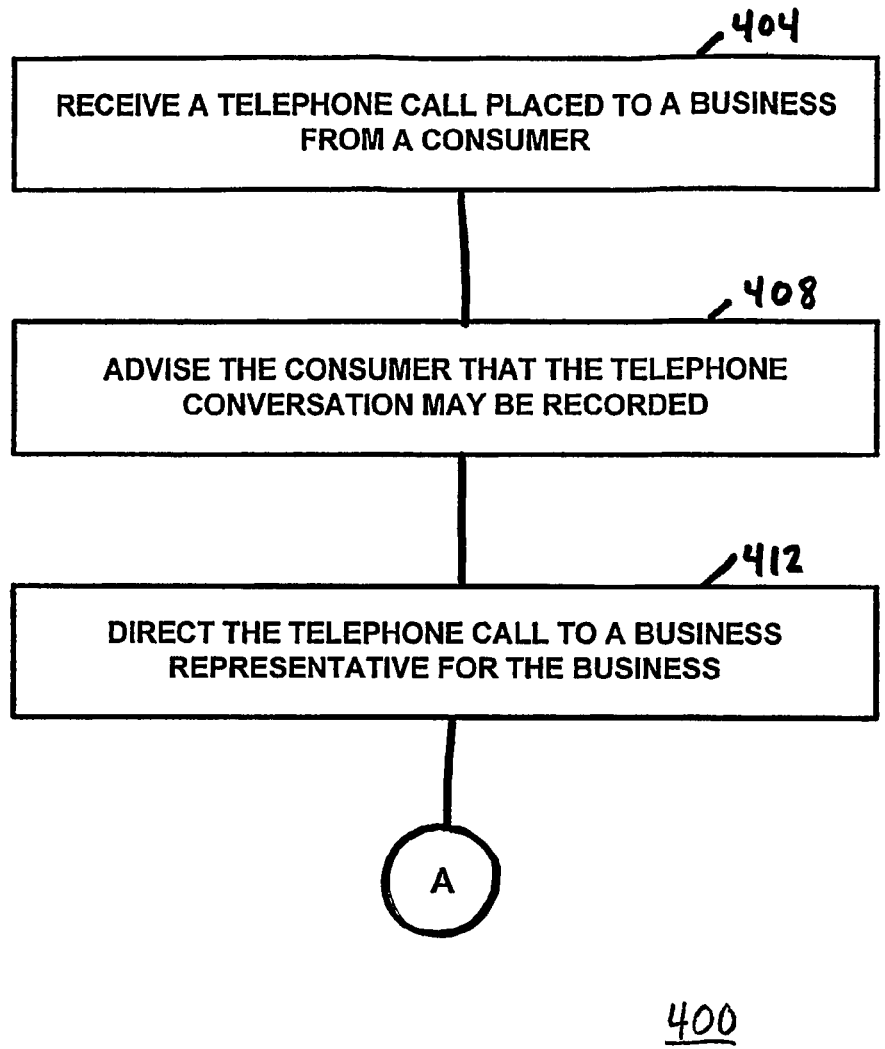
FIGS. 4A, 4B, 4C, 4D and 4E illustrate a flow chart demonstrating a method of implementing a call monitoring system according to one embodiment of the invention.
Figure 4B:
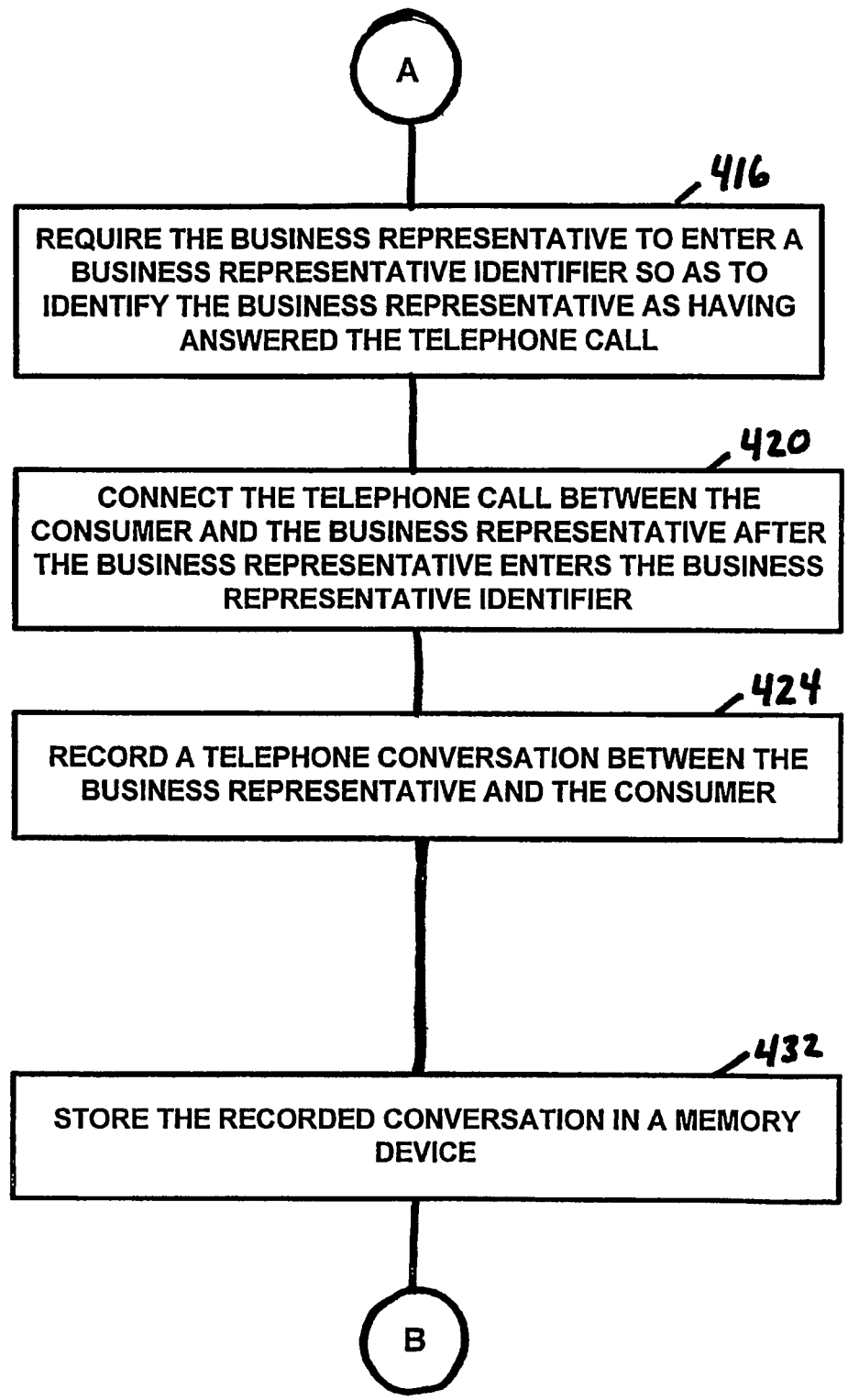
Figure 4C:
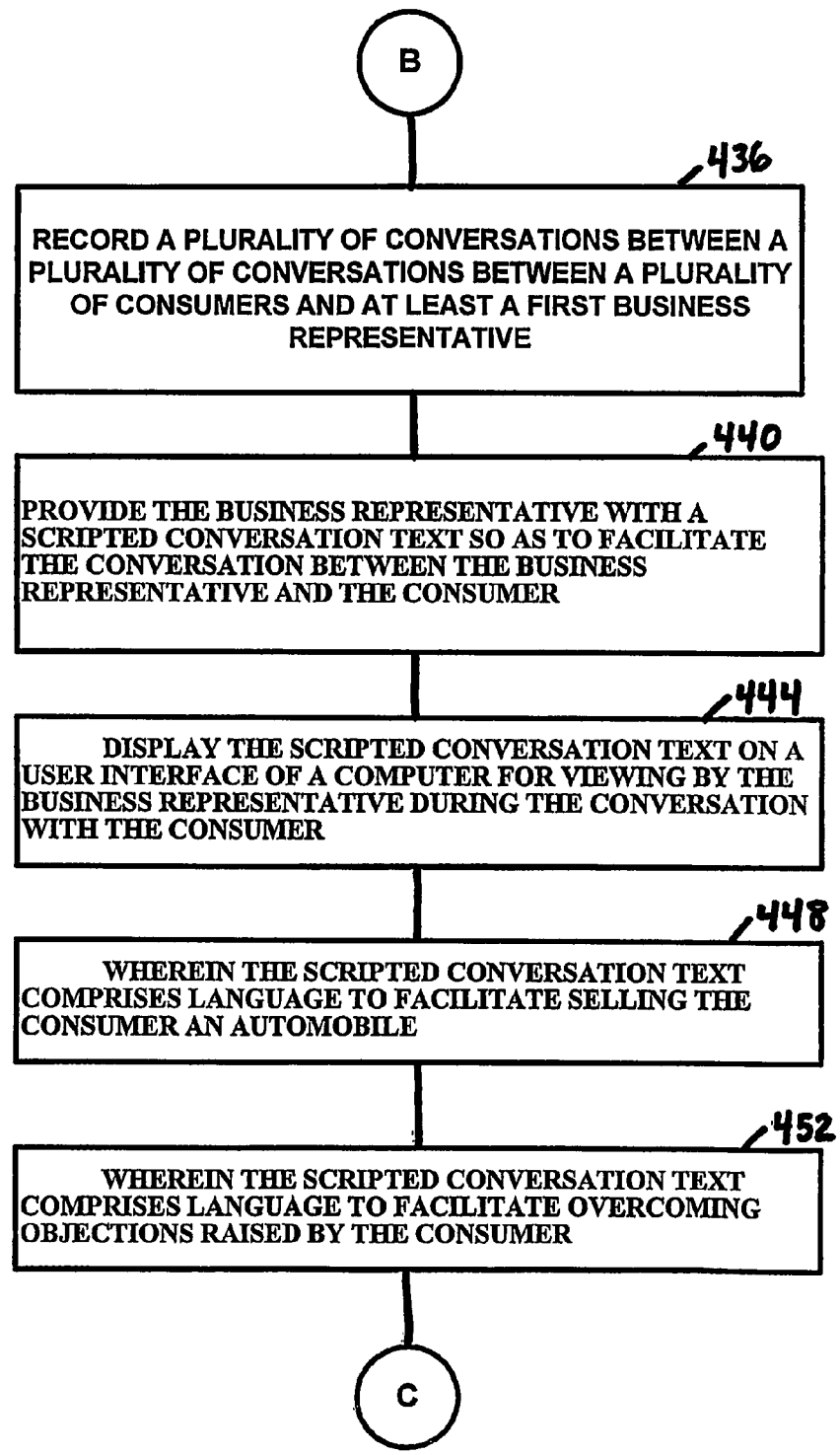
Figure 4D:
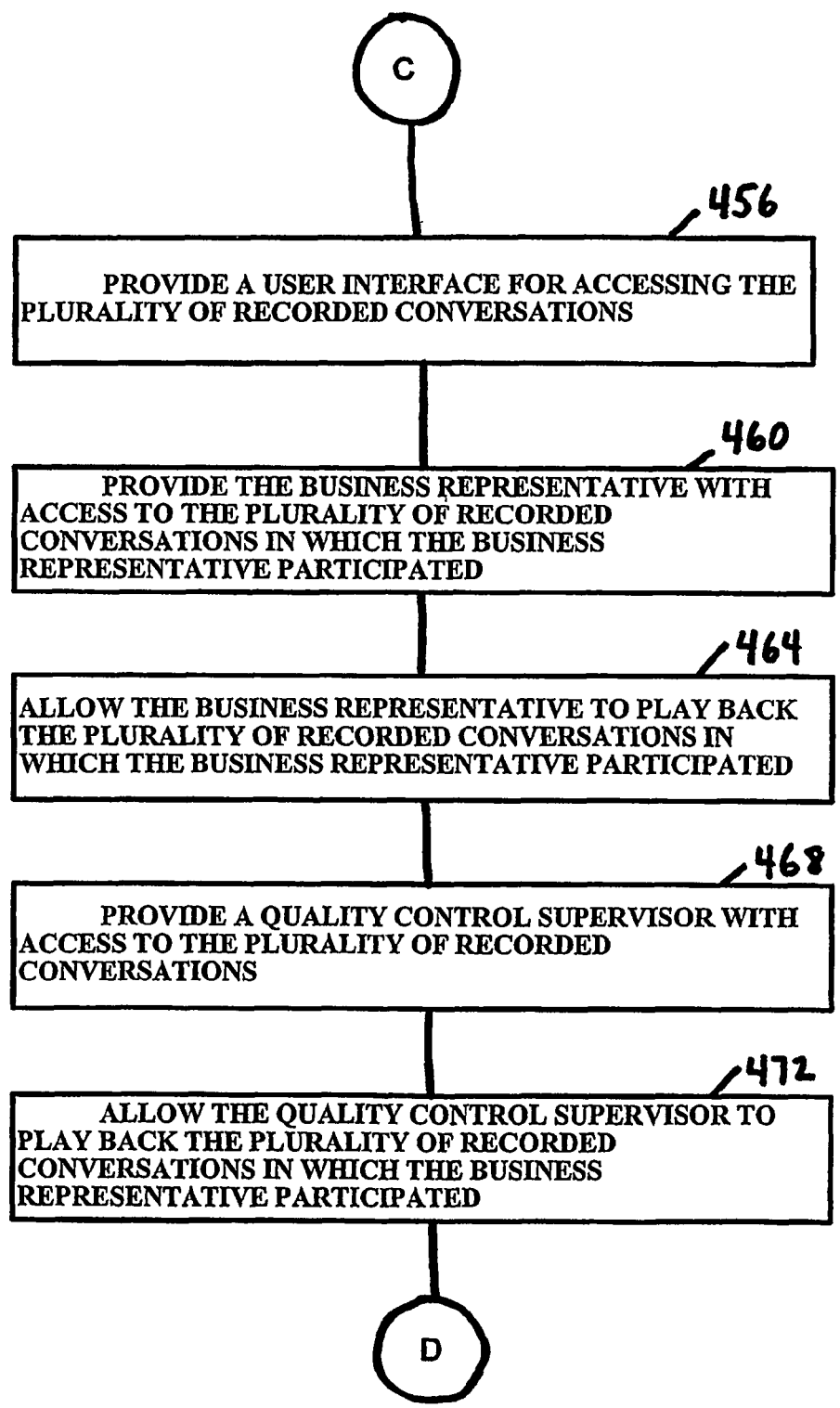
Figure 4E:
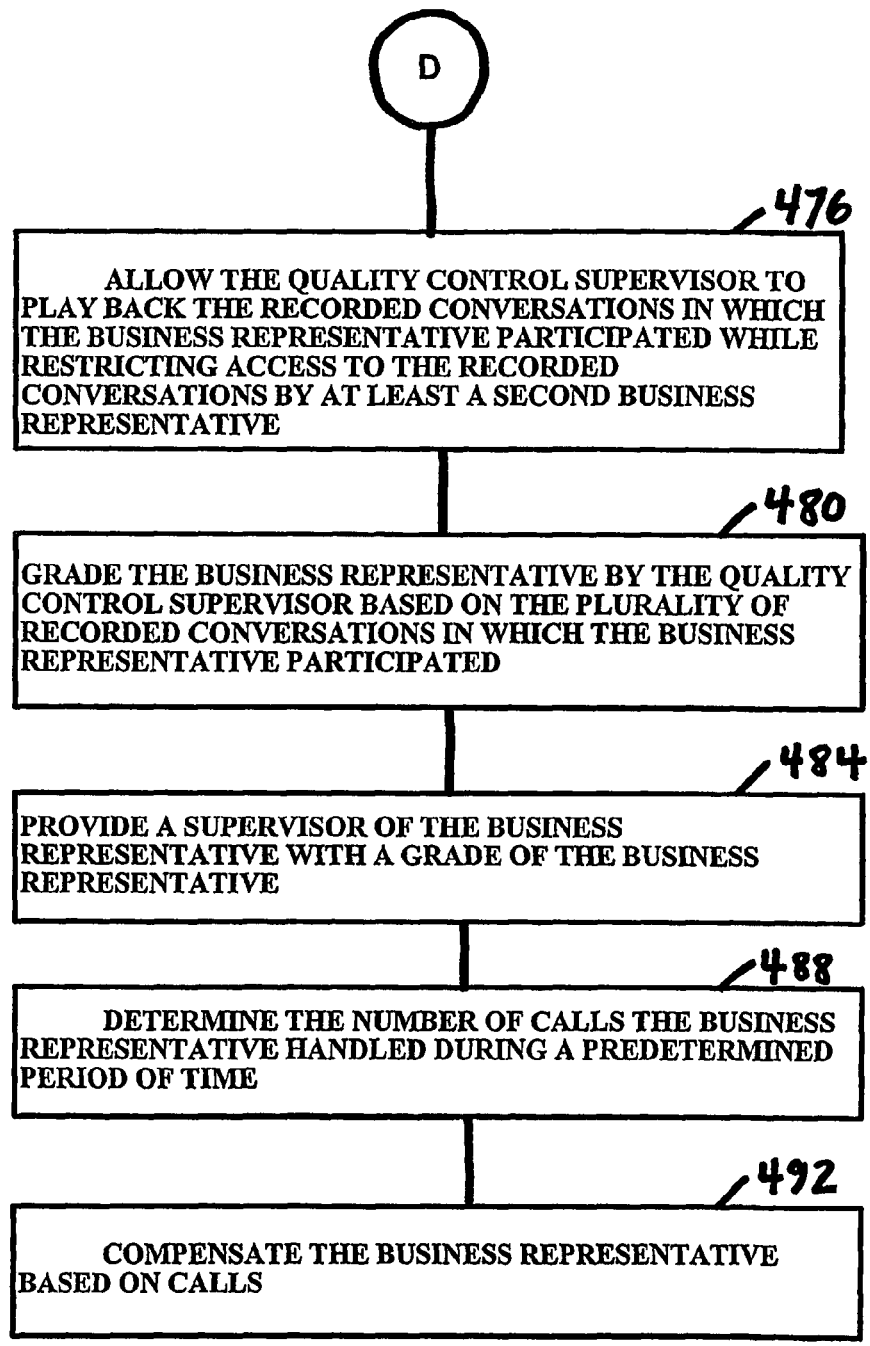

FIG. 3 illustrates a block diagram for a system 300 which can be utilized to implement the different computing devices shown in FIG. 2. FIG. 3 broadly illustrates how individual system elements can be implemented. System 300 is shown comprised of hardware elements that are electrically coupled via bus 308, including a processor 301, input device 302, output device 303, storage device 304, computer-readable storage media reader 305a, communications system 306, processing acceleration (e.g., DSP or special-purpose processors) 307 and memory 309. Computer-readable storage media reader 305a is further coupled to computer-readable storage media 305b, the combination comprehensively representing remote, local, fixed and/or removable storage devices plus storage media, memory, etc. for temporarily and/or more permanently containing computer-readable information, which can include storage device 304, memory 309 and/or any other such accessible system 300 resource. System 300 also comprises software elements (shown as being currently located within working memory 391) including an operating system 392 and other code 393, such as programs, applets, data and the like.

System 300 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 300 component (e.g. within communications system 306). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 300 components will necessarily be required in all cases.

Referring now to FIGS. 4A, 4B, 4C, 4D, and 4E, a working embodiment of the invention can be better understood. FIGS. 4A, 4B, 4C, 4D, and 4E illustrate a flow chart demonstrating a method of implementing a call monitoring system. This method is applicable to a variety of different businesses. As noted earlier, a business, such as an automotive sales dealership, can utilize different advertising campaigns to solicit calls from consumers. Similarly, a brokerage house can provide a variety of different investment funds that are advertised with different telephone numbers. As yet another example, some class action attorneys solicit class members by associating different telephone numbers with different class actions advertised in their television commercials. Thus, in order to process the significant numbers of calls that these different businesses receive, the telephone calls are filtered based upon the telephone number that was called. In this way, they can also determine the effectiveness of different advertising campaigns. For example, the same product can be advertised in different types of advertising campaigns and the number of calls received in response to each advertising campaign can be tracked so as to determine the relative effectiveness of the different advertising campaigns.

Flow chart 400 illustrates that a telephone call can be received from a consumer that has been placed to a telephone number associated with one of the advertising campaigns, as shown in block 404. According to one working embodiment, the call is routed through a telephone bank so as to allow an application service provider service to record the call. It is then forwarded to the business where a business representative is located. However, according to an alternative embodiment, the called number could be the number of the business where the business representative is working—thus, the call would not need to be routed through a phone bank in such an instance. As an initial step in receiving the telephone call, the consumer can be advised by an automated recording that the telephone conversation may be recorded, as shown in block 408. For example, a message that indicates that the conversation will be recorded so as to ensure quality of service could be utilized. In block 412, the telephone call can be directed to a business representative for the business. An example of such a business representative is a sales person fielding a call for the purposes of selling an automobile. However, a variety of industries can be served according to the present embodiment of the invention.

In block 416, the business representative is requested to enter a business representative identifier so as to identify that particular business representative as having answered the telephone call. By requiring a person such as a sales person or receptionist to enter this personal identifier, the recorded conversation can be associated with that identifier so as to form a stored record. This allows tracking of the recorded conversation for future playback by specific individuals. Furthermore, it forces a business representative to be accountable for each call that is answered by that particular representative. One could imagine that in many instances a call would not be handled properly by a business representative. In such a case, the business representative would not want to store the call for later playback by that individual's supervisor, as it might result in the business representative being graded down or disciplined. Thus, by forcing the business representative to enter his or her personal identifier prior to connecting the business representative with the incoming call, the business representative is forced to be accountable for the quality of the recorded telephone conversation. This results in all of the incoming telephone calls being recorded and accounted for. Thus, it provides the greatest opportunity to provide quality assurance in allowing a supervisor or quality control personnel to review all of the calls that were received and recorded.

Once the business representative has entered his or her personal identifier, the telephone call can be connected to that particular business representative's telephone, as shown in block 420. The personal identifier can be entered in a variety of ways that would be readily recognized by those of ordinary skill in the art. For example, the business representative could log in to a portal running the call monitoring system and enter the personal identifier into a prompt on the user interface when a call is received. In this way, the software would recognize the user's identifier and transfer the call to the business representative's telephone. Alternatively, the business representative's phone could ring initially and the business representative could be prompted via an automated announcement to accept responsibility for the incoming call by entering his or her personal identifier in the keypad of the telephone. Once the personal identifier was keyed in to the telephone, the call could be transferred to the business representative's handset.

Once the call is connected, the telephone conversation between the business representative and the calling consumer can be recorded, as shown in block 424. This can be accomplished by coupling the software of the call monitoring system with the voice line of the telephone and recording the telephone conversation between the consumer and the business representative. This is further highlighted by block 432 which indicates that the recorded telephone conversation is stored in a memory device, such as a database or other memory device accessible via a computerized system.

Block 436 illustrates that this process can be repeated for multiple incoming calls. Throughout the day, a business representative can field multiple calls from the same consumer or different consumers. Each call can be recorded and stored in memory for future retrieval. Furthermore, different business representatives for the same business can have conversations recorded on the same memory or database.

As part of the training aspect of one embodiment of the invention, a scripted conversation text can be provided so as to facilitate a conversation between a consumer and the business representative. This is particularly helpful for a new employee that is unfamiliar with the typical information that needs to be provided in a particular business. For example, in the automotive sales industry, it is beneficial to obtain contact information about a consumer so that follow-up telephone calls can be placed to that particular consumer so as to try and complete a sale. Thus, a scripted text can be provided via a computer interface for walking a new employee, for example, through typical conversations with callers. This scripted text can be accessed via a user interface for the call monitoring system so as to display on the user interface the text of a conversation to be conducted with a consumer. This is shown in blocks 440 and 444. As noted earlier, the scripted conversation text can comprise language that helps to facilitate selling the consumer a product, such as an automobile, as illustrated in block 448. Furthermore, since customer service calls often deal with objections by consumers, the scripted text can include language to facilitate overcoming these objections raised by the calling consumer. This is shown in block 452. Thus, the call handling scripts can be designed to assist in acquiring the first and last name of a consumer, a call-back number, getting the consumer to commit to making an in-person appearance, and using proper etiquette in dealing with consumers.

According to one embodiment of the invention, the call monitoring system can provide training to business representatives. Block 456 shows that a user interface can be provided as part of the call monitoring software for accessing recorded conversations in which a particular business representative took part. The user interface can display icons for the different records for conversations that a particular business representative took part in during a specified period of time. Furthermore, the business representative can be provided with access rights to these multiple conversations, as shown in block 460 so as to allow playback of the conversations, as indicated in block 464. Training can take place in this fashion in that the business representative can replay telephone conversations that were recorded and note errors and achievements in each conversation. This allows the business representative to review his or her work and make mental notes for the future for achieving the desired standard for conversations with consumers. The individual can even grade himself or herself so as to reinforce the learning experience. Each call record can be associated with a page for notes and the grade can be self-assigned for later viewing. This allows the business representative to conveniently refer back to and select good calls and bad calls so as to gain additional feedback from previously listened to conversations.

Furthermore, a quality control supervisor can be given access to a particular business representative's recorded telephone conversations, as shown in block 468. This allows the supervisor to review a particular individual's conversations so as to perform a review or quality control function. Because the business representative was required to enter a personal identifier in order to receive each incoming call, all of the individual's recorded conversations will be stored in the call monitoring system. This allows an accurate review of the business representative's work product. The business representative is unable to remove calls in which he or she performed poorly. Thus, the quality control supervisor has a full sampling of the business representative's work. Block 472 notes that the quality control supervisor can select which of the recorded conversations to play for purposes of performing a review. Furthermore, the quality control supervisor can be provided access not only to a single business representative, but multiple business representatives. This can be accomplished by providing the supervisor with administrative rights for all of the recorded conversations of the business representatives, for example. While access is desirable for a quality control supervisor, it is not necessarily true that it is desirable for individual business representatives to have access to their co-workers recorded conversations. Thus, each individual business representative can be provided with access to their own recorded conversations, but not given access to their co-workers' recorded conversations. Again, this can be implemented with an administrative access code as would be understood by those of ordinary skill in the art. This is further illustrated in block 476.

Once the quality control representative or supervisor has reviewed at least one recorded conversation, a grade can be assigned to the business representative, as shown in block 480. A grade can be assigned to each recorded conversation. Furthermore, a grade can be based on a sampling of the recorded conversations or all of the recorded conversations. If a third party quality control agent is performing the quality control review, he or she can provide the grade to a supervisor of the business representative, as shown in block 484. Thus, this allows an independent contractor to review the recorded conversations and assign a grade based on criteria provided by the business or supervisor and report the grades of the business representatives to the supervisor at the business.

According to one embodiment of the invention, the forced recordation of calls received by a business representative can serve as a measure of compensation for a business representative. For example, where the business representative is a sales person, the forced recording of all telephone calls can allow a supervisor to determine the total number of calls fielded by that particular sales person. Block 488 thus shows that the number of calls received by such a sales person during a predetermined period of time can be determined. Thus, for example, during a particular month, the number of calls fielded by a sales person can be determined and a bonus can be calculated based on that number of calls, as shown in block 492. Alternatively, the quality of the conversations can be utilized to compensate the business representative. Thus, an average grade on telephone calls fielded by a business representative can serve as the determining factor for compensating the business representative. This is a particularly applicable model in the customer service industry.

Figure 5:
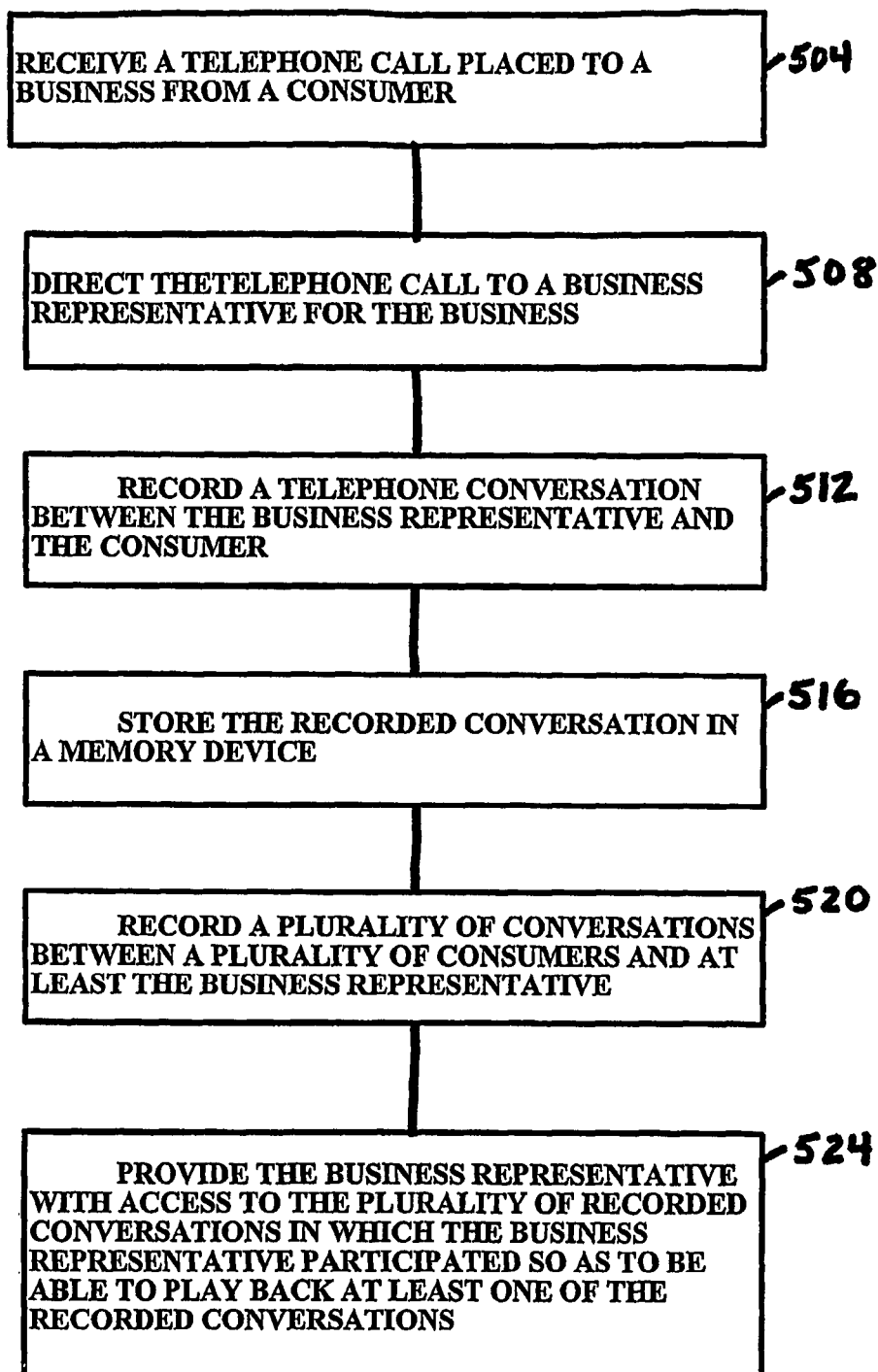
FIG. 5 illustrates a flow chart demonstrating a method of providing training for a business representative according to one embodiment of the invention.

FIGS. 5, 6A, 6B, 7 and 8 illustrate more focused examples of system 400. For example, FIG. 5 illustrates a flow chart 500 for implementing a method of providing training for a business representative, such as a sales person. In block 504, a telephone call is received that has been placed to a business from a consumer. In block 508, the telephone call is directed to a business representative for the business. This telephone conversation can be recorded between the business representative and the consumer, as indicated in block 512, and the recorded conversation can be stored in a memory device, as shown in block 516. Multiple conversations between consumers and a business representative can be recorded, as shown in block 520, and the business representative can be provided with access to the recorded conversations so as to be able to play back at least one of the recorded conversations, as shown in block 524. This allows for the business representative to learn from the recorded conversations. The recorded conversations can be selected from a user interface that groups the recorded conversations by a specific business representative. Furthermore, access can be restricted so that only a particular business representative can listen to his or her calls along with access being provided to a supervisor of that particular business representative.

Figure 6A:
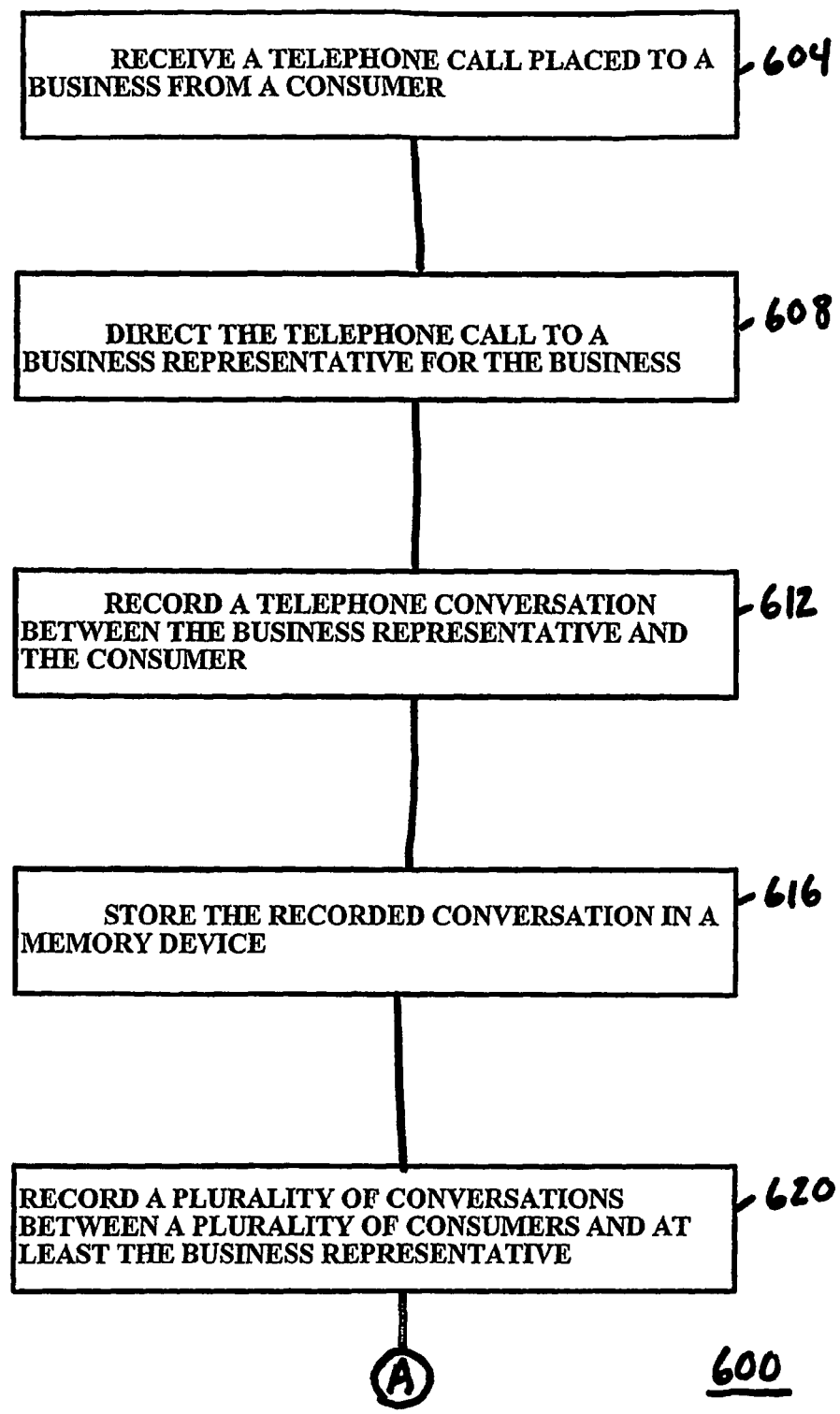
FIGS. 6A and 6B illustrate a flow chart demonstrating a method of implementing quality control in a call monitoring system according to one embodiment of the invention.
Figure 6B:
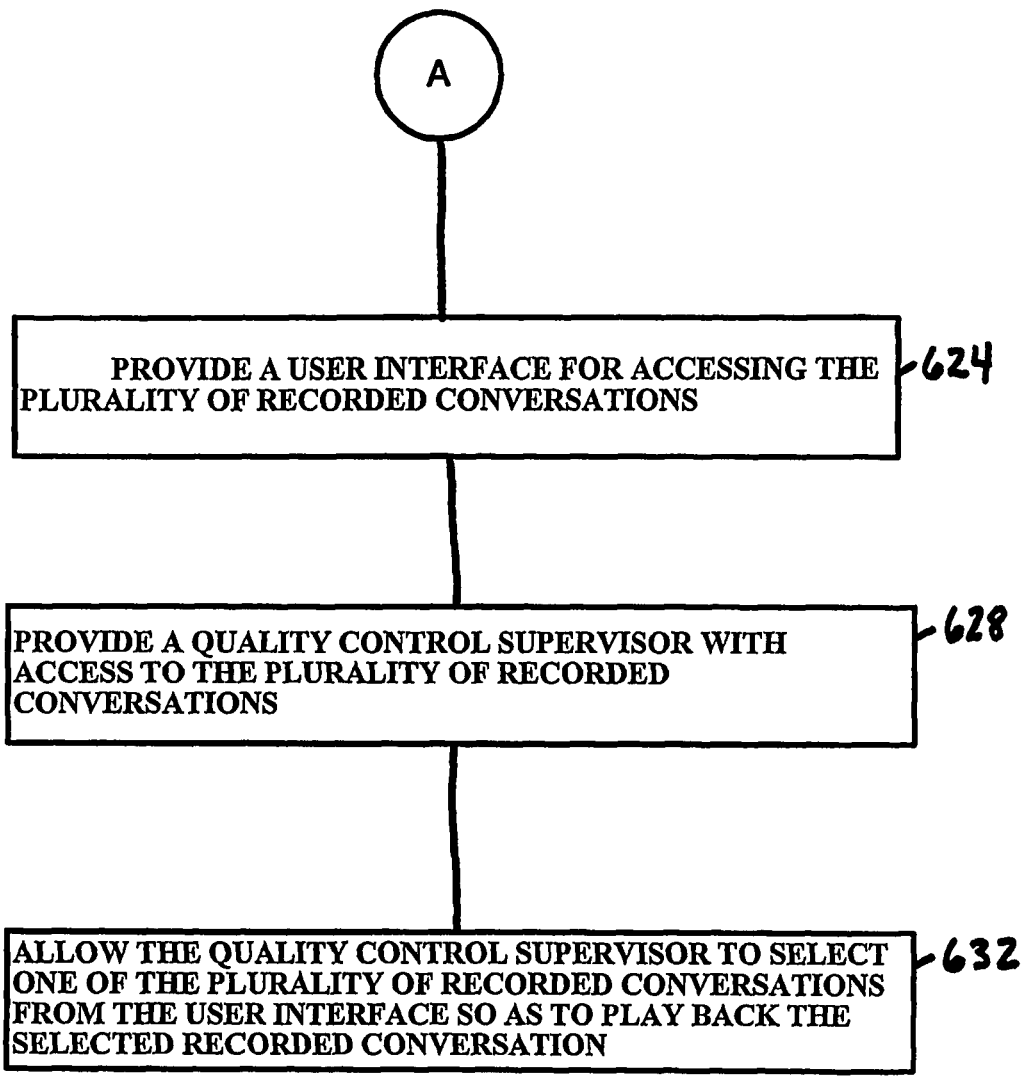

FIGS. 6A and 6B illustrate a flow chart 600 for implementing a method of providing quality control. Block 604 illustrates that a telephone call placed to a business from a consumer is received. The telephone call is directed to a business representative for the business, as shown in block 608. The telephone conversation is recorded between the business representative and the consumer, as shown in block 612, and the recorded conversation is stored in a memory device, as shown in block 616. Multiple conversations are recorded between multiple consumers and at least one business representative, as indicated in block 620. A user interface is provided for accessing the multiple recorded conversations in block 624. A quality control supervisor can be provided with access to the multiple recorded conversations, as shown in block 628. Furthermore, the quality control supervisor can be allowed to select at least one of the recorded conversations via the user interface so as to play back the selected recorded conversation.

Figure 7:
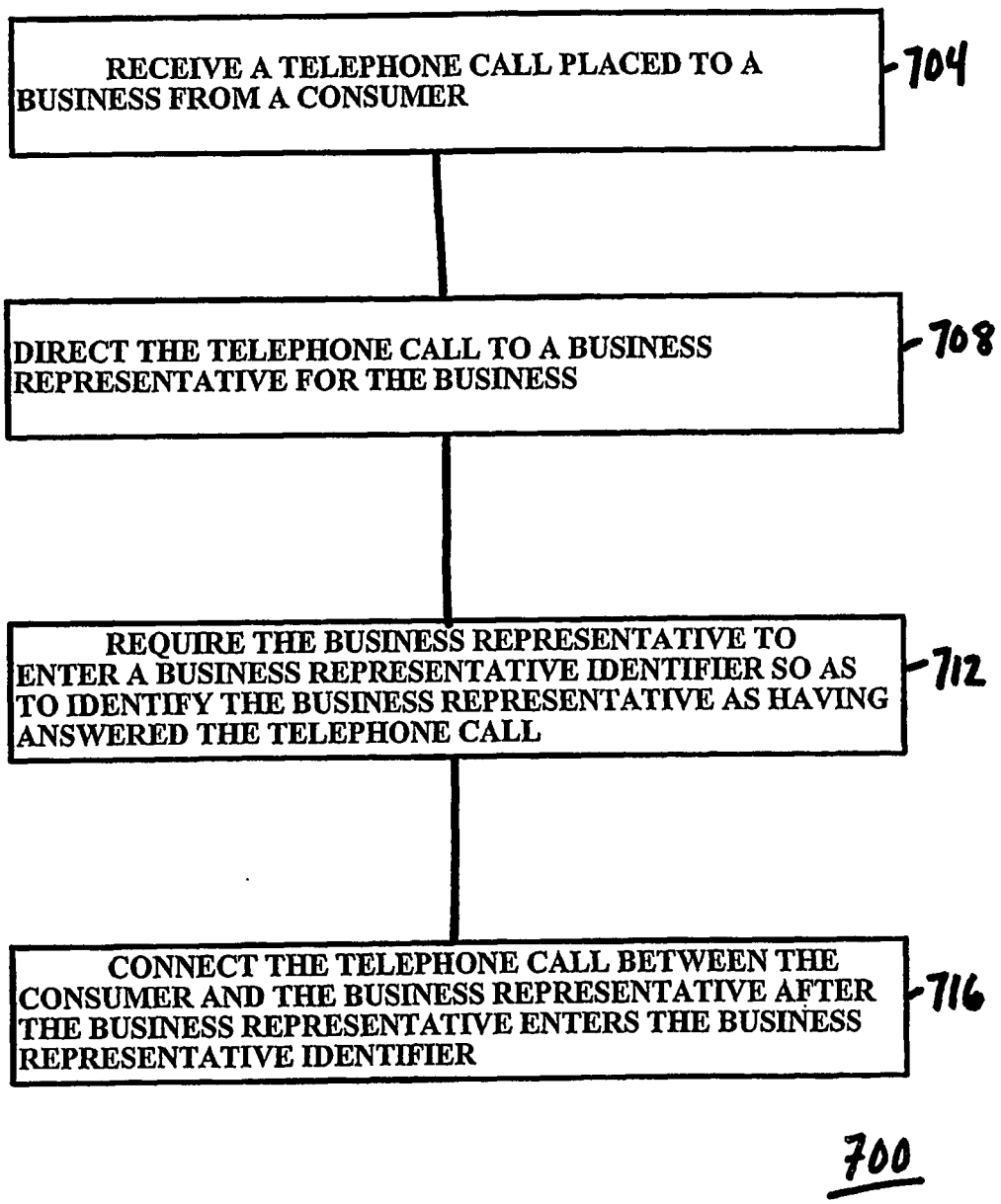
FIG. 7 illustrates a flow chart demonstrating a method of implementing an accountability system for tracking calls received by a business representative according to one embodiment of the invention.

FIG. 7 illustrates a flow chart 700 for implementing a method of providing accountability by a business representative when receiving incoming telephone calls. In block 704, a telephone call is received that has been placed to a business by a consumer. The telephone call is directed to a business representative for that business, as shown in block 708. The business representative is required to enter a business representative so as to identify the business representative as having answered the telephone call, as shown in block 712. The telephone call is connected between the consumer and business representative after the business representative enters the business representative identifier, as indicated in block 716. This forces the business representative to enter an identifier before fielding an incoming call. Thus, all calls are accounted for and the business representative is not able to discard recorded conversations after completion of a call. This helps to ensure complete accountability of the business representative's telephone calls.

Figure 8:
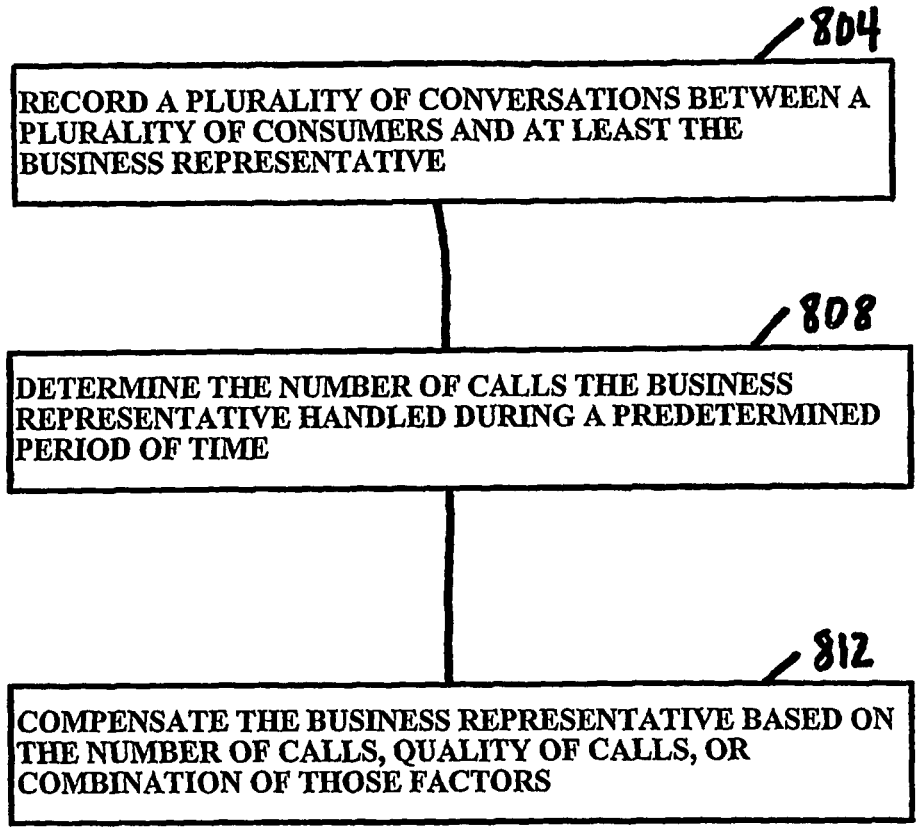
FIG. 8 illustrates a flow chart demonstrating a method of compensating a business representative according to one embodiment of the invention.

FIG. 8 illustrates an embodiment in which a user's compensation is based on the calls received. Namely, in flow chart 800, multiple conversations between multiple consumers and at least one business representative are recorded, as shown in block 804. The number of calls the business representative handled during a predetermined period of time is determined, as shown in block 808, and the business representative is compensated based on the number of calls, quality of calls or both, as shown in block 812. Thus, the user's compensation, such as a bonus or salary, can be calculated based on the calls taken by that individual.

Figure 9:
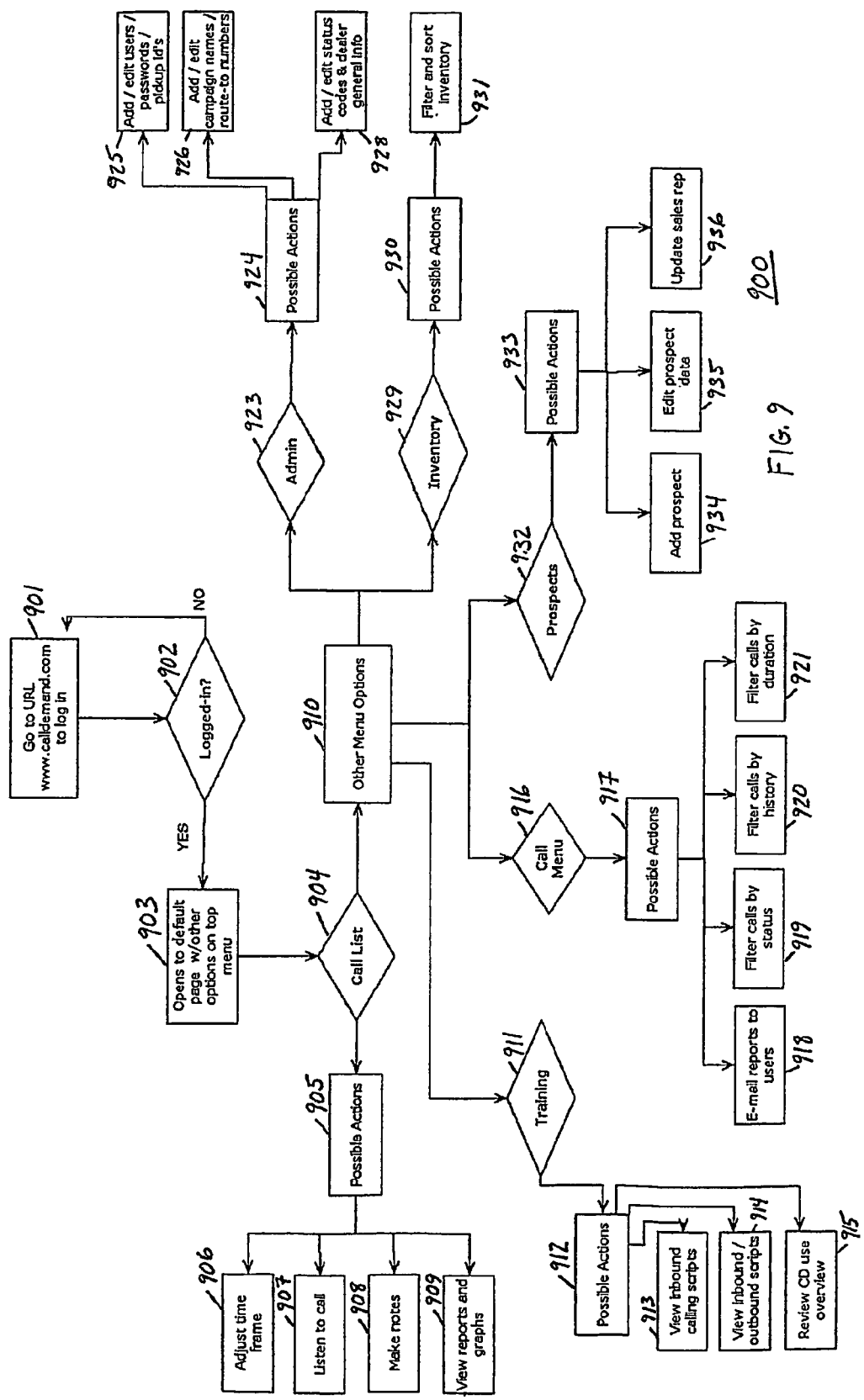
FIG. 9 illustrates a flow chart demonstrating a method of implementing software for a call monitoring system according to one embodiment of the invention.
Figure 10:
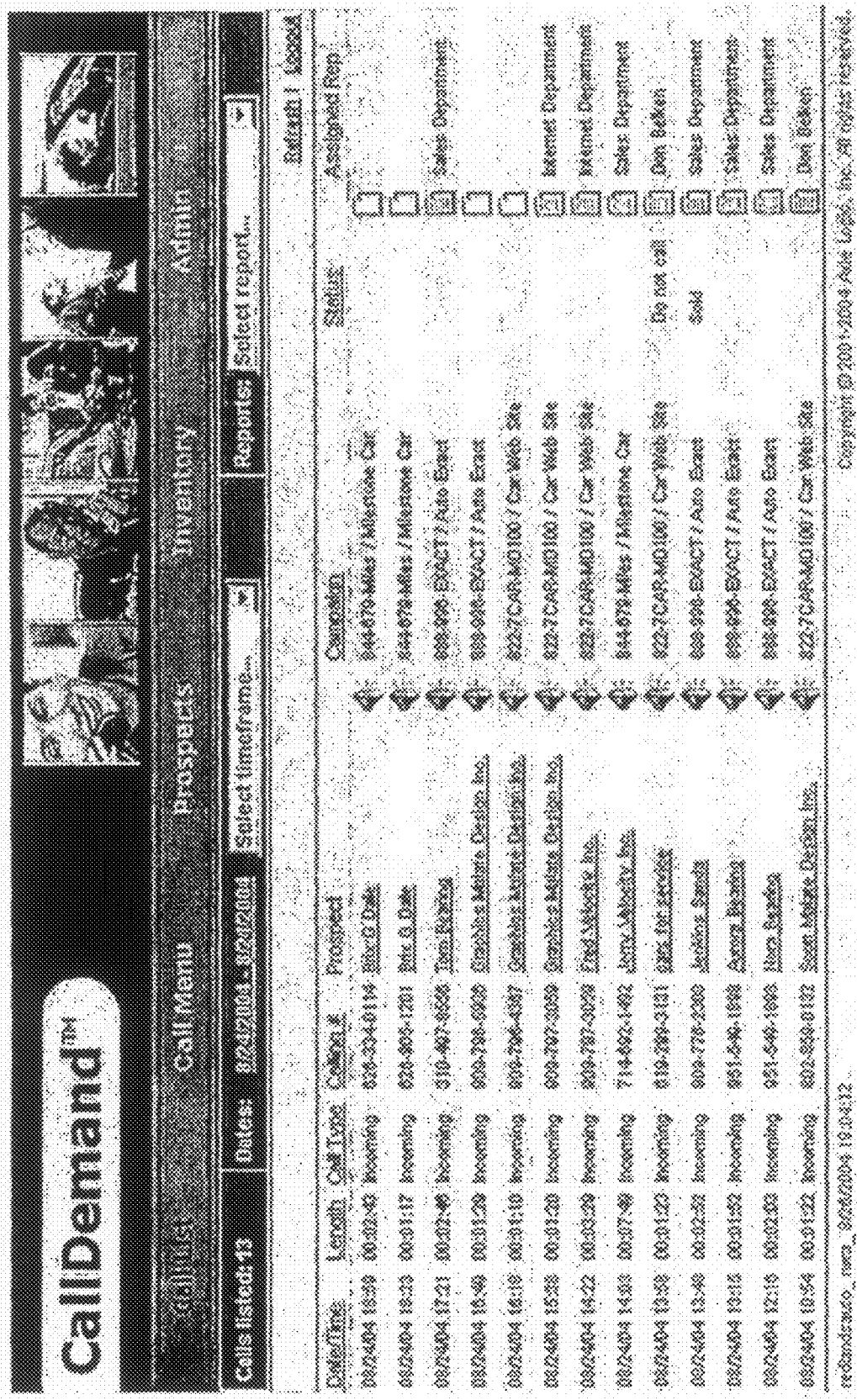
FIG. 10 illustrates a graphical user interface for accessing recorded telephone conversation data, according to one embodiment of the invention.

FIG. 9 illustrates a flow chart 900 for a method of implementing a call monitoring system, according to one embodiment of the invention. Block 901 illustrates that the user, such as a business representative or business representative supervisor, can go to a URL for logging in to a call monitoring site. In decision block 902, a determination is made as to whether or not the user has successfully logged in. Upon successful login, block 903 shows that the site can open to a default web page with a variety of options displayed in a menu format. Block 904 shows that one menu option is a list of calls. An example of such a page is shown in FIG. 10. The possible actions indicated in block 905 for the list of calls are to adjust the time frame, as indicated in block 906. This allows the user to select the date time frame during which calls were received. Block 907 shows that a selected call can be listened to. This can be accomplished for example by clicking on the speaker icon displayed on FIG. 10 and associated with a particular call row. Furthermore, block 908 indicates that notes can be added to a call record. Furthermore, block 909 indicates that reports and graphs of call records can be generated. For example, a report of all the calls received during a particular day can be generated and e-mailed to an administrator or supervisor. Furthermore, graphs can be prepared indicating the number of calls received for a particular advertising campaign or for different advertising campaigns during a given time period.

Referring to FIG. 10, an example of a call record can be seen for a recorded conversation. The top record shows that the recorded conversation was received on Aug. 24, 2004 at 18:59. The call lasted for 2 minutes and 43 seconds. It was an incoming call placed from telephone number 626-334-0114. The consumer's name was Brix G. Dale and he called the number 844-579-MILES or the Milestone Car advertising campaign number. No status is associated with the record; however, different statuses such as sold; do not call, appointment set, etc. could be included. Also, a business representative name could be included for the record. Selecting the speaker icon allows one to playback the recorded conversation. Similarly, selecting the note icon allows one to retrieve notes recorded about the conversation. Selecting the user's name allows one to retrieve information about the consumer.

Figure 14:
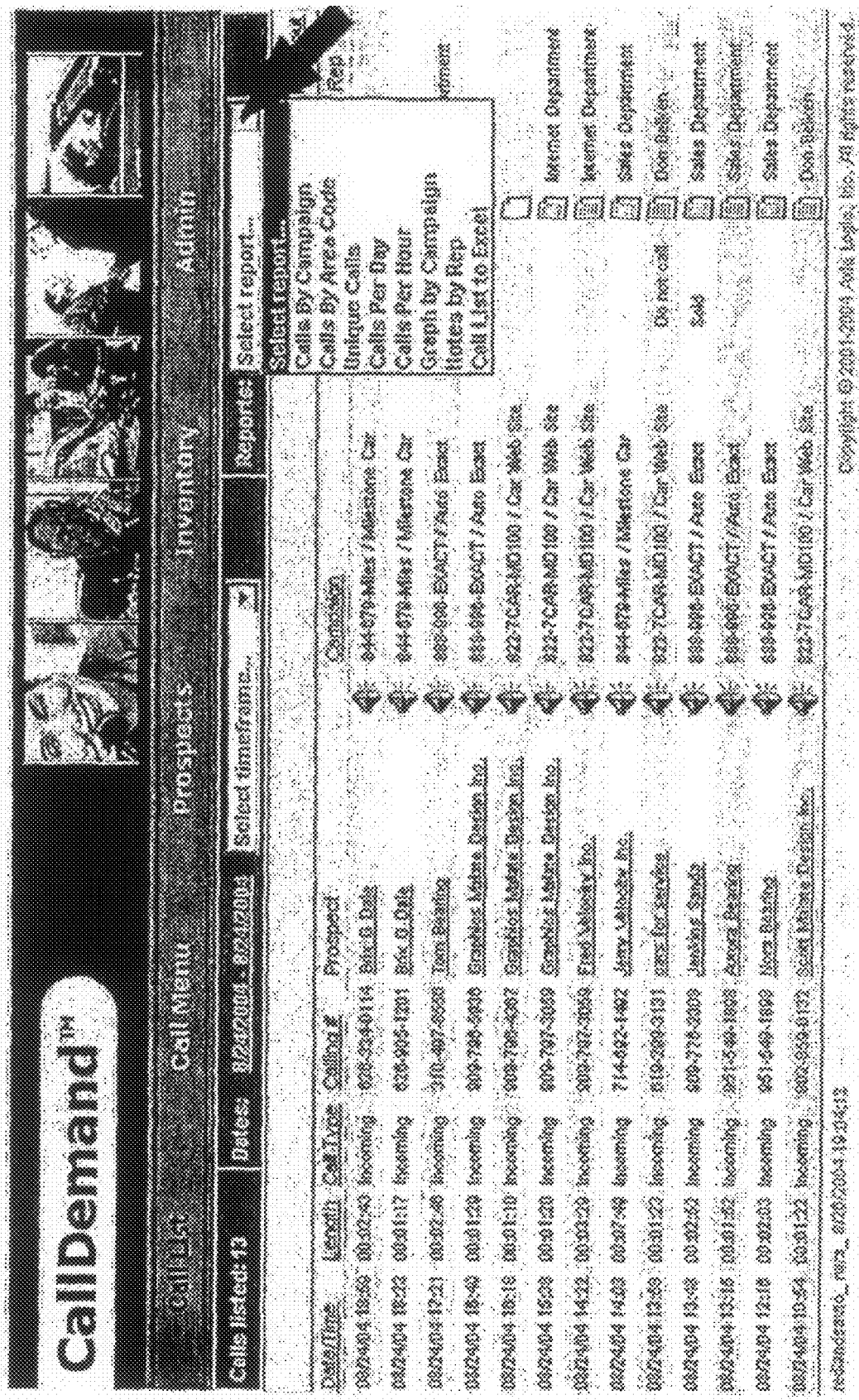
FIG. 14 illustrates a graphical user interface for generating reports, according to one embodiment of the invention.
Figure 15:
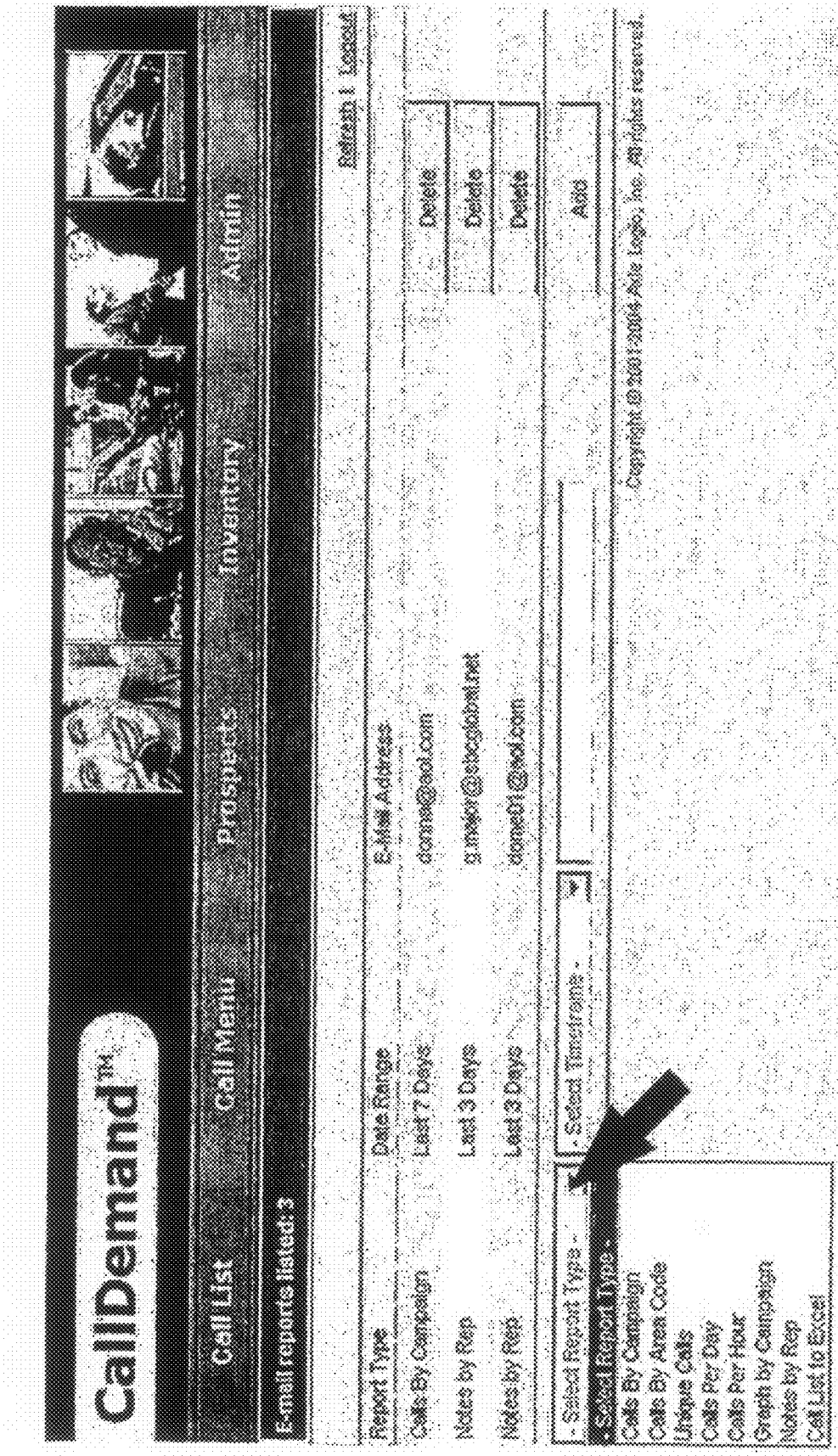
FIG. 15 illustrates a graphical user interface for coordinating distribution of a report via email according to another embodiment of the invention.
Figure 17:
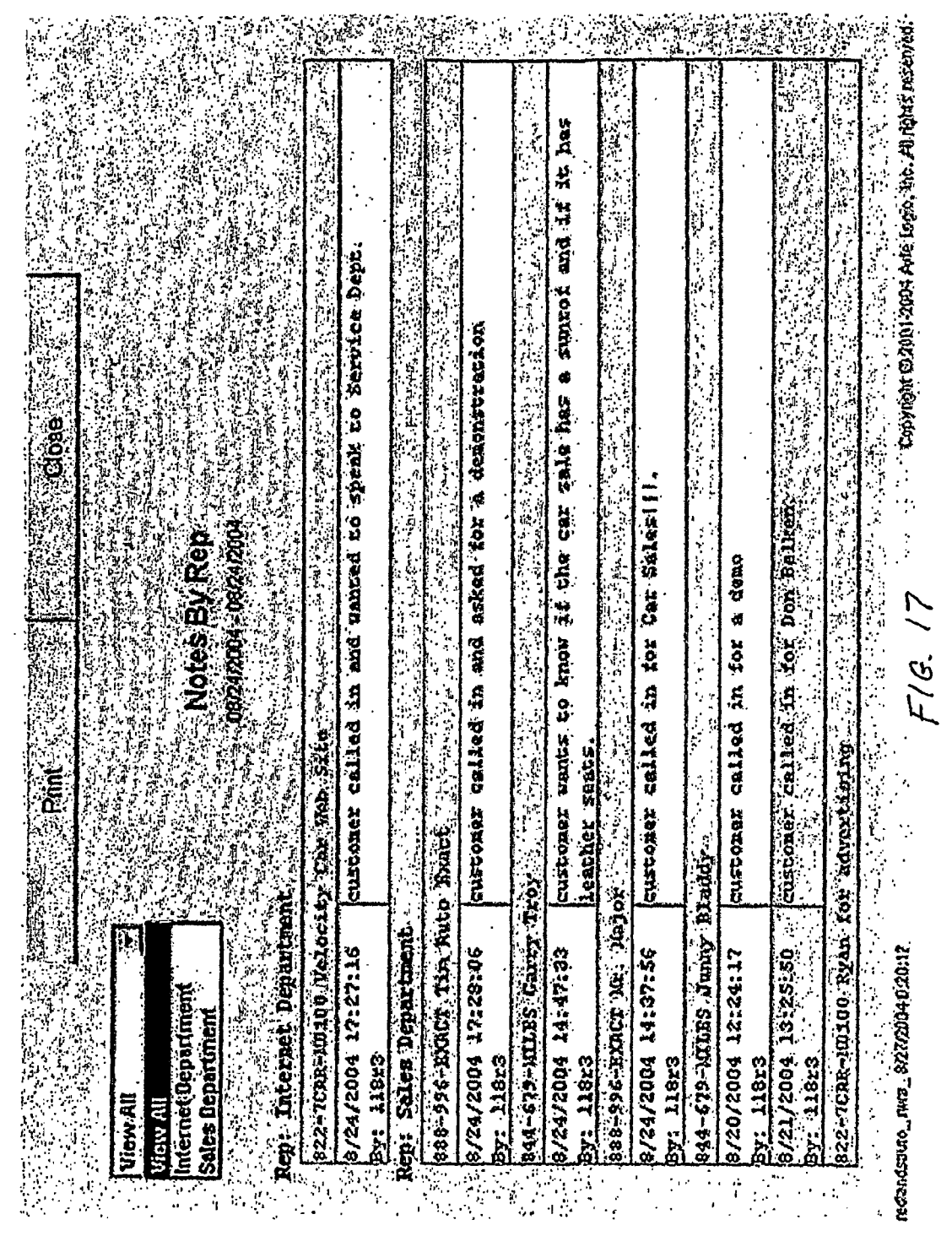

Furthermore, the call list page provides controls for generating reports about recorded conversations. FIG. 14 illustrates how a drop down menu can be accessed to prompt a user to generate different types of reports. For example, reports can be generated for calls by advertising campaign, calls by area code, unique calls, calls per day, calls per hour, graphs by campaign, notes by representative, and for mapping the call list page to a spreadsheet. Further drop down menus can be provided on a subsequent page for associating a time period for the report and an email address to which the report should be sent, as shown in FIG. 15. Thus, a report can be configured by type of call data to include, time period, and destination email address. This allows a supervisor or administrator to receive reports as desired. It allows a snapshot of business representative activity to be accessed by a sales manager, for example. FIG. 16 illustrates how a report can be generated in spreadsheet format. Similarly, FIG. 17 shows how a report showing all the notes taken by a particular entity (individual or department, for example) can be generated. Again, these reports can be useful to a supervisor to gain a better overall view of the activity of the business and the business representative(s).

Referring again to FIG. 9, block 910 indicates that other menu options can be provided as well. For example, block 911 indicates that a training icon can be displayed for selection. Possible sub-actions can be selected under the training icon, as indicated in block 912. For example, conversation text scripts for incoming calls can be viewed, as indicated in block 913. Furthermore, outbound scripts can be displayed, as shown in block 914. Also, an overview of the call monitoring software can be reviewed as shown in block 915.

Figure 11:
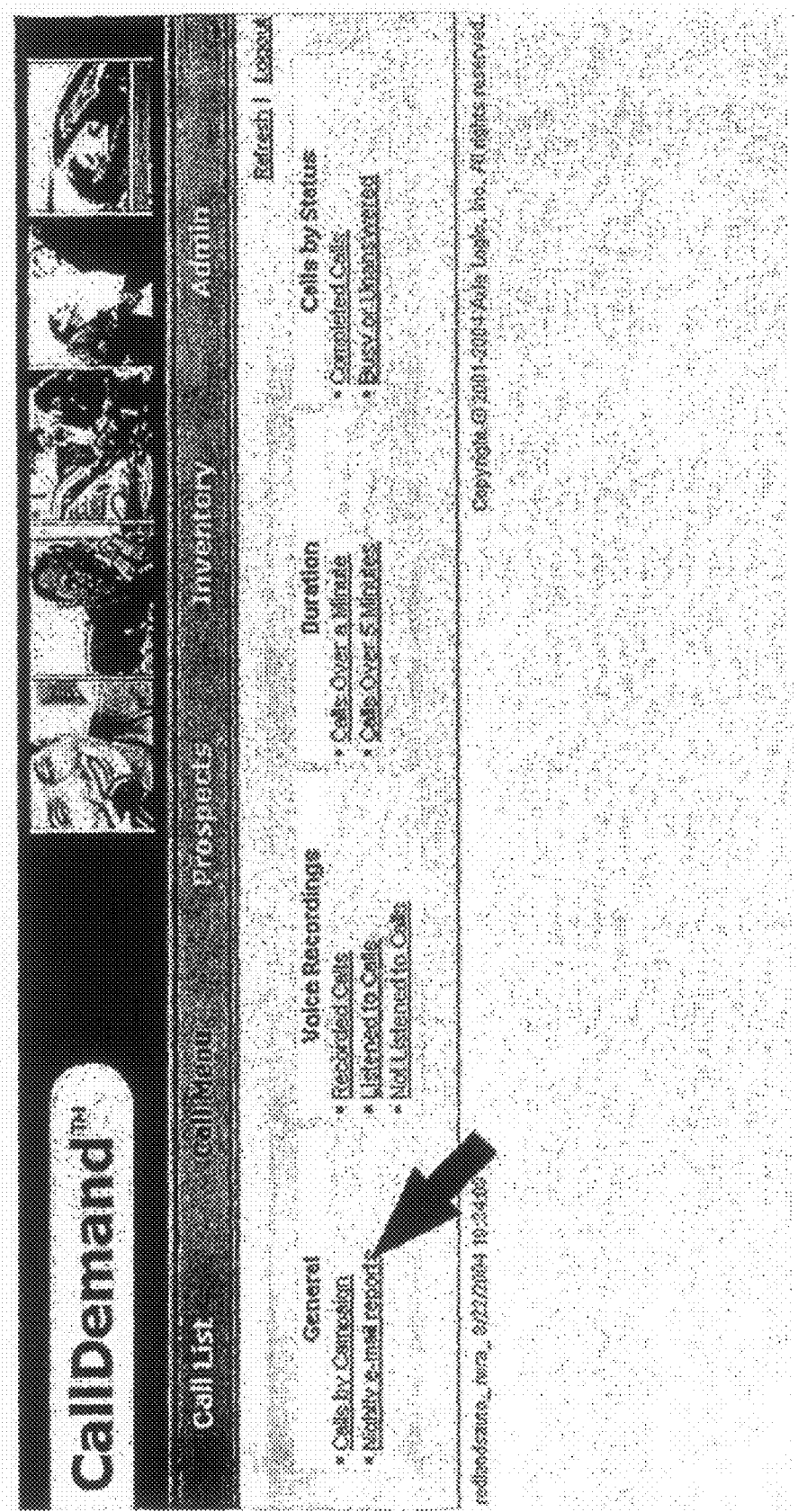
FIG. 11 illustrates a graphical user interface for filtering recorded telephone conversations, according to one embodiment of the invention.

Similarly, a call menu icon can be displayed, as shown in block 916. FIG. 11 shows an example of such a call menu page. Possible actions can be provided for this option, as indicated in block 917. For example, reports can be e-mailed to users, as shown in block 918. Furthermore, calls can be filtered based on their status, history, or length of time, as indicated in blocks 919, 920 and 921, respectively.

Figure 12:
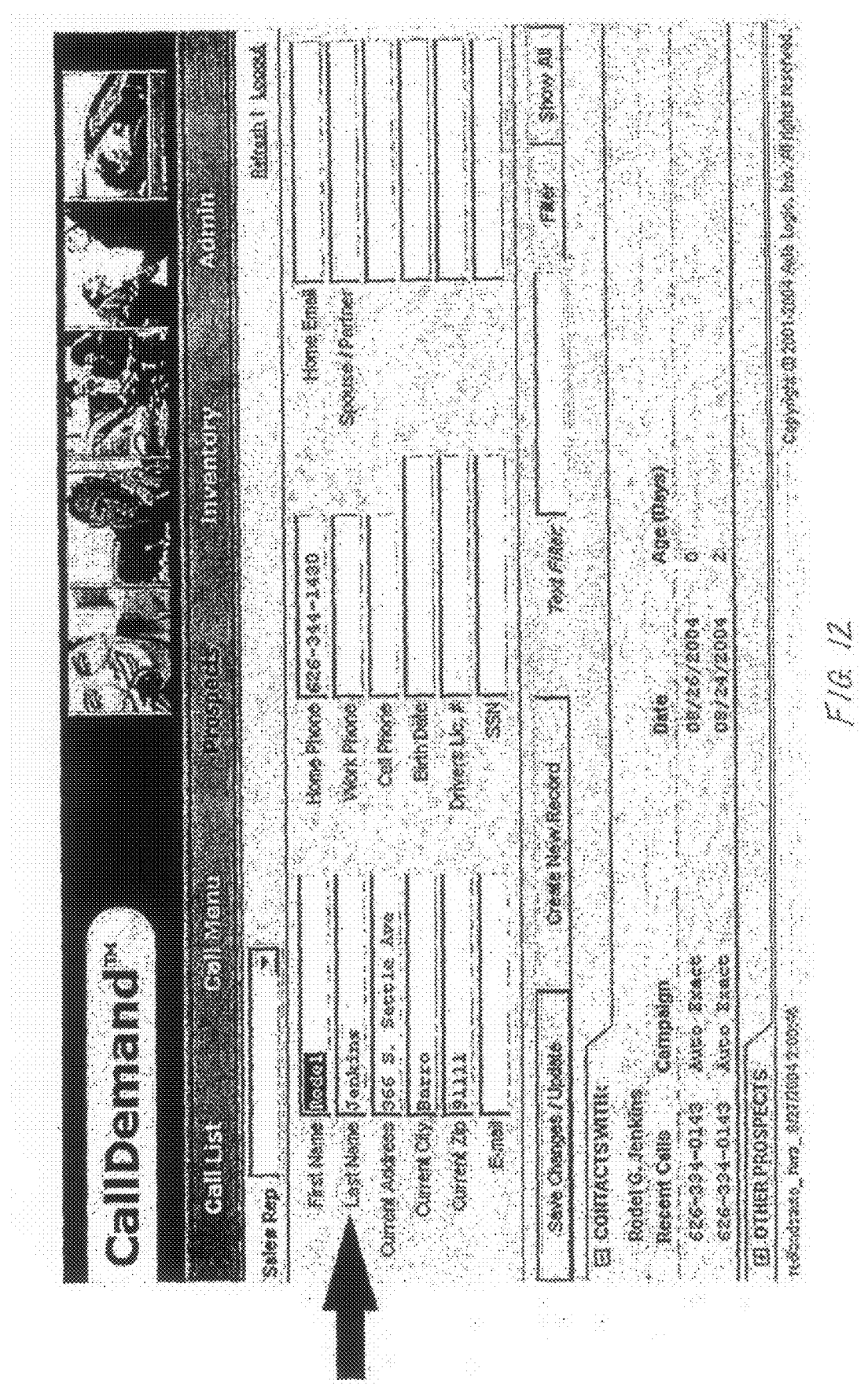

Another menu option is for prospective consumers, as shown in block 932. FIG. 12 shows an example of such a page for prospective consumer data. A variety of possible actions are available, as indicated in block 933. For example, a text block can be displayed to add information about a new prospect, as shown in block 934. Furthermore, the prospect data can be edited, as shown in block 935, and, sales representative information can be updated, as shown in block 936.

Block 929 indicates that the call monitoring system can be associated with software for tracking inventory. Block 930 indicates that a variety of actions are available. For example, the list of inventory can be filtered and sorted, as shown in block 931.

Figure 13:
FIG. 13 illustrates a graphical user interface for administering rights to recorded conversations, according to one embodiment of the invention.

Block 923 indicates that an administrative menu option can be selected. An example of an administrative page is shown in FIG. 13. A variety of possible actions are available under the administrative option, as shown by block 924. For example, users, passwords and pickup identifiers can be added and/or edited, as shown in block 925. Similarly, campaign names and route-to numbers can be added or edited, as shown in block 926. Route-to numbers can be associated with particular advertising campaigns so that calls coming in to a particular telephone number are routed to a specific business representative or business representatives. Furthermore, once a consumer has called in for the first time and been connected to a particular business representative, future calls from that consumer's telephone line can be routed to that same business representative that handled the initial call. This can be accomplished by noting the originating telephone number for any incoming call and performing a look-up in the database that cross-references that originating telephone number and the called telephone number so as to forward the telephone call to the business representative associated with that particular set of originating telephone number and called number. Block 928 shows that status codes and general information about a business can be added or edited.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of monitoring consumer calls placed to a business and conducted between a consumer and a business representative, said method comprising:
    receiving an incoming telephone call placed to a business from a consumer, wherein the incoming telephone call from the consumer is initiated external from the business;
    directing said incoming telephone call to a business representative for said business;
    thereafter, requiring said business representative to enter a business representative identifier through a telephone so as to identify said business representative as having answered said incoming telephone call;
    thereafter, connecting said incoming telephone call between said consumer and said business representative after said business representative enters said business representative identifier, wherein;
    recording a telephone conversation between said business representative and said consumer;
    storing said recorded conversation and the business representative identifier in a memory device;
    recording a plurality of conversations between a plurality of consumers and at least said business representative;
    providing said business representative with access to said plurality of recorded conversations in which said business representative participated so as to be able to play back at least one of said recorded conversations; and
    displaying on a user interface a first icon for accessing said recorded conversations of said business representative that have already been played back and a second icon for accessing said recorded conversations of said business representative that have not yet been played back.

2. The method as claimed in claim 1 and further comprising:
advising said consumer that said incoming telephone call may be recorded.

3. The method as claimed in claim 1 and further comprising:
providing said business representative with a scripted conversation text so as to facilitate said conversation between said business representative and said consumer.

4. The method as claimed in claim 3 and further comprising:
displaying said scripted conversation text on a user interface of a computer for viewing by said business representative during said conversation with said consumer.

5. The method as claimed in claim 3 wherein said scripted conversation text comprises language to facilitate selling said consumer an automobile.

6. The method as claimed in claim 3 wherein said scripted conversation text comprises language to facilitate overcoming objections raised by said consumer.

7. The method as claimed in claim 1 and further comprising:
providing a user interface for accessing said plurality of recorded conversations.

8. The method as claimed in claim 1 and further comprising:
providing a quality control supervisor with access to said plurality of recorded conversations.

9. The method as claimed in claim 8 and further comprising:
allowing said quality control supervisor to play back said plurality of recorded conversations in which said business representative participated.

10. The method as claimed in claim 8 and further comprising:
grading said business representative by said quality control supervisor based on said plurality of recorded conversations in which said business representative participated.

11. The method as claimed in claim 8 and further comprising:
providing a supervisor of said business representative with a grade of said business representative.

12. The method as claimed in claim 1 and further comprising:
allowing said business representative to record a grade for a played back recorded conversation and associate said grade with said recorded conversation.

13. The method as claimed in claim 1 and further comprising:
determining the number of calls said business representative handled during a predetermined period of time.

14. The method as claimed in claim 13 and further comprising:
compensating said business representative based on said number of calls.

15. A method of monitoring consumer calls placed to a business and conducted between a consumer and a business representative, said method comprising:
receiving an incoming telephone call placed to a business from a consumer;
directing said incoming telephone call to a business representative for said business;
thereafter, requiring said business representative to enter a business representative identifier through a telephone so as to identify said business representative as having answered said incoming telephone call;
thereafter, connecting said incoming telephone call between said consumer and said business representative after said business representative enters said business representative identifier;
thereafter, recording a telephone conversation between said business representative and said consumer;
storing said recorded conversation and the business representative identifier in a memory device;
recording a plurality of conversations between a plurality of consumers and at least said business representative;
providing a user interface for accessing said plurality of recorded conversations;
providing a quality control supervisor with access to said plurality of recorded conversations;
allowing said quality control supervisor to select one of said plurality of recorded conversations from said user interface so as to play back the selected recorded conversation; and
displaying on the user interface a first icon for accessing said recorded conversations of said business representative that have already been played back and a second icon for accessing said recorded conversations of said business representative that have not yet been played back.

16. The method as described in claim 15 and further comprising:
requiring said business representative to enter a business representative identifier so as to identify said business representative as having answered said incoming telephone call;
connecting said incoming telephone call between said consumer and said business representative after said business representative enters said business representative identifier.

17. The method as claimed in claim 15 and further comprising:
providing said business representative with access to said plurality of recorded conversations in which said business representative participated.

18. The method as claimed in claim 17 and further comprising:
allowing said business representative to play back said plurality of recorded conversations in which said business representative participated.

19. The method as claimed in claim 15 and further comprising:
allowing said quality control supervisor to play back said plurality of recorded conversations in which said business representative participated.

20. The method as claimed in claim 15 and further comprising:
allowing said quality control supervisor to play back said recorded conversations in which said business representative participated while restricting access to said recorded conversations by at least a second business representative.

21. The method as claimed in claim 15 and further comprising:
grading said business representative by said quality control supervisor based on said plurality of recorded conversations in which said business representative participated.

22. The method as claimed in claim 15 and further comprising:
providing a supervisor of said business representative with a grade of said business representative.

23. A method of monitoring consumer calls placed to a business and conducted between a consumer and a business representative, said method comprising:

- receiving an incoming telephone call placed to a business from a consumer;
- advising said consumer that said incoming telephone call may be recorded;
- directing said incoming telephone call to a business representative for said business;
- thereafter, requiring said business representative to enter a business representative identifier through a telephone so as to identify said business representative as having answered said incoming telephone call;
- thereafter, connecting said incoming telephone call between said consumer and said business representative after said business representative enters said business representative identifier;
- recording a telephone conversation between said business representative and said consumer;
- storing said recorded conversation and the business representative identifier in a memory device;
- recording a plurality of conversations between a plurality of consumers and at least said business representative;
- providing said business representative with a scripted conversation text so as to facilitate said conversation between said business representative and said consumer;
- displaying said scripted conversation text on a user interface of a computer for viewing by said business representative during said conversation with said consumer;
- wherein said scripted conversation text comprises language to facilitate overcoming objections raised by said consumer;
- providing a user interface for accessing said plurality of recorded conversations;
- providing said business representative with access to said plurality of recorded conversations in which said business representative participated;
- allowing said business representative to play back said plurality of recorded conversations in which said business representative participated;
- providing a quality control supervisor with access to said plurality of recorded conversations;
- allowing said quality control supervisor to play back said plurality of recorded conversations in which said business representative participated;
- allowing said quality control supervisor to play back said recorded conversations in which said business representative participated while restricting access to said recorded conversations by at least a second business representative;
- grading said business representative by said quality control supervisor based on said plurality of recorded conversations in which said business representative participated;
- providing a supervisor of said business representative with a grade of said business representative;
- determining the number of calls said business representative handled during a predetermined period of time;
- compensating said business representative based on said number of calls; and
- displaying on the user interface a first icon for accessing said calls of said business representative that have already been played back and a second icon for accessing said calls of said business representative that have not yet been played back.

* * * * *